United States Patent
Yamamoto et al.

(10) Patent No.: US 7,076,140 B2
(45) Date of Patent: Jul. 11, 2006

(54) OPTICAL FIBER, DISPERSION COMPENSATOR, OPTICAL TRANSMISSION LINE AND OPTICAL COMMUNICATIONS SYSTEM

(75) Inventors: Yoshinori Yamamoto, Yokohama (JP); Takashi Fujii, Yokohama (JP); Takatoshi Kato, Yokohama (JP); Eisuke Sasaoka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 217 days.

(21) Appl. No.: 10/717,202

(22) Filed: Nov. 20, 2003

(65) Prior Publication Data

US 2004/0146258 A1 Jul. 29, 2004

(30) Foreign Application Priority Data

Nov. 20, 2002 (JP) ........................ P2002-336856
Aug. 26, 2003 (JP) ........................ P2003-301839

(51) Int. Cl.
G02B 6/02 (2006.01)

(52) U.S. Cl. ........................ 385/123; 385/126
(58) Field of Classification Search ......... 385/120–125, 385/147, 141–145, 126–127
See application file for complete search history.

(56) References Cited

U.S. PATENT DOCUMENTS

| 6,393,188 | B1 |   | 5/2002 | Jeong et al. |
| 6,519,402 | B1 | * | 2/2003 | Aikawa et al. ............. 385/124 |
| 2001/0019651 | A1 |   | 9/2001 | Kato |
| 2002/0097969 | A1 | * | 7/2002 | Aikawa et al. ............. 385/123 |
| 2004/0146258 | A1 | * | 7/2004 | Yamamoto et al. ......... 385/123 |

OTHER PUBLICATIONS

NFOCEC, National Fiber Optic Engineers Conference, "Technical Proceedings" Hosted by: Telcordia Technologies, 18th Annual Conference, ©2002, Title page—pp. 1171–1182.

COC 2002, 28th European Conference on Optical Communication, "PROCEEDINGS" Sep. 11, 2002, Title page, 2 pgs.

(Continued)

*Primary Examiner*—Akm Enayet Ullah
(74) *Attorney, Agent, or Firm*—McDermott Will & Emery LLP

(57) ABSTRACT

The present invention relates to an optical fiber or the like which allows more precise compensation for the chromatic dispersion of a transmission optical fiber over a broad wavelength band. The optical fiber has a chromatic dispersion of −100 ps/nm/km or less in a wavelength band of 1535 to 1565 nm, 1565 to 1610 nm, 1554 to 1608 nm or 1535 to 1610 nm. In particular, the chromatic dispersion profile of the fundamental mode of this optical fiber defined by the orthogonal coordinate system of the wavelength and chromatic dispersion value has a shape such that, over the entire wavelength band except for the shortest and longest wavelengths thereof, the chromatic dispersion values on the chromatic dispersion profile are respectively located on the minus side of the associated chromatic dispersion values on a straight line connecting the chromatic dispersion values at the shortest and longest wavelength. Since the chromatic dispersion profile of the transmission optical fiber such as a conventional single-mode fiber or the like has a shape opposite to that of this optical fiber, the chromatic dispersion of the transmission optical fiber can be compensated for more precisely by using this optical fiber as a dispersion compensating optical fiber.

65 Claims, 22 Drawing Sheets

OTHER PUBLICATIONS

Hirano et al., Dispersion Compensating Fiber Over 140 nm–Bandwidth, Proc. 27the Eur. Conf. on Opt. Comm. (ECOC'01–Amsterdam), pp. 494–495.

Hirano et al., "Novel Dispersion Flattened Link Consisting of New NZ–DSF and Dispersion Compensating Fiber Module", pp. 99–100.

OFC® 2002 "Optical Fiber Communication Conference and Exhibit", Technical Digest, Mar. 17–22, 2002, 2 Title pgs, pp. 327–329.

OFC '96 Technical Digest, "ThA" Dispersion Compensation, pp. 200–201.

* cited by examiner

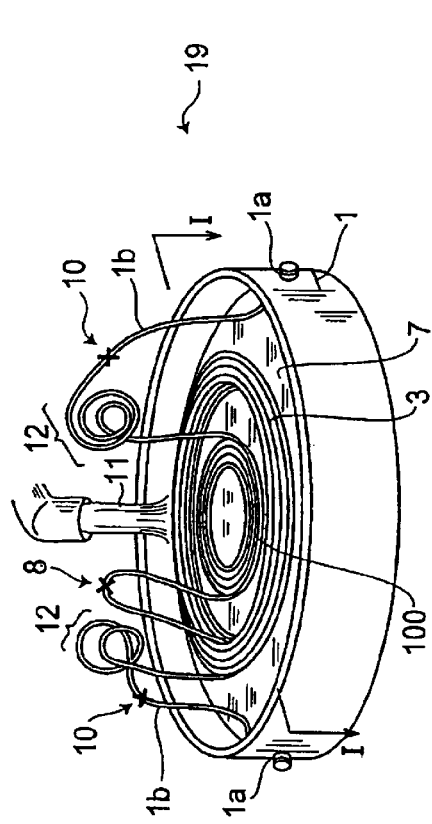
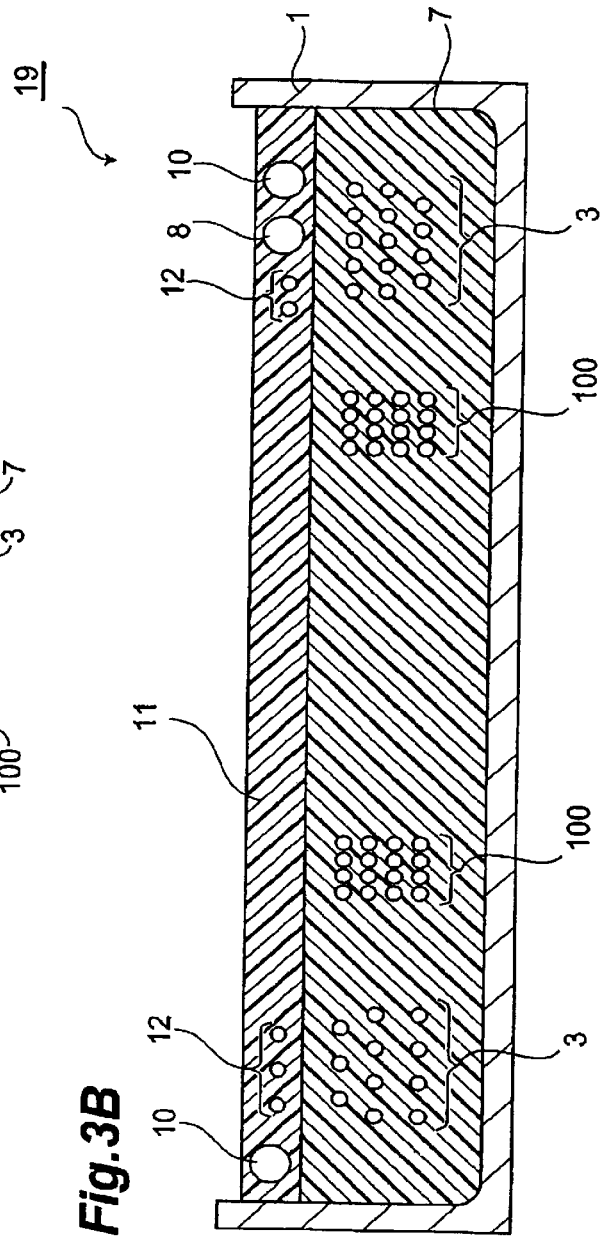
Fig.3A
Fig.3B

Fig.6

| DISPERSION COMPENSATING OPTICAL FIBER | Δn1 (%) | Δn2 (%) | Δn3 (%) | 2a (μm) | 2b (μm) | 2c (μm) | CHROMATIC DISPERSION AT 1520 nm (ps/nm/km) | DISPERSION SLOPE AT 1520 nm (ps/nm2/km) | CHROMATIC DISPERSION AT 1550 nm (ps/nm/km) | DISPERSION SLOPE AT 1550 nm (ps/nm2/km) | EFFECTIVE CUTOFF WAVELENGTH (μm) | MFD AT 1550 nm (μm) | INCREASE IN BENDING LOSS WITH BENDING DIAMETER OF 40 mm AT 1550 nm (dB/km) | INCREASE IN BENDING LOSS WITH BENDING DIAMETER OF 60 mm AT 1550 nm (dB/km) |
|---|---|---|---|---|---|---|---|---|---|---|---|---|---|---|
| SAMPLE F1 | 2.8 | -0.74 | 0.32 | 2.6 | 5.2 | 10.8 | -172 | -0.16 | -176 | -0.08 | 1.28 | 4.0 | ≦0.01 | ≦0.01 |
| SAMPLE F2 | 2.8 | -0.74 | 0.32 | 3.2 | 7.7 | 15.4 | -249 | -0.64 | -263 | -0.28 | 1.45 | 4.2 | ≦0.05 | ≦0.01 |
| COMPARATIVE EXAMPLE F3 | 1.6 | -0.50 | 0.30 | 4.3 | 11.0 | 15.4 | -61 | -0.25 | -70 | -0.36 | 1.40 | 4.7 | ≦0.5 | ≦0.02 |

Fig.7

| DISPERSION COMPENSATOR | PREPARED FIBER | FIBER LENGTH (km) | GLASS DIAMETER (μm) | COATING DIAMETER (μm) | TOTAL CHROMATIC DISPERSION (ps/nm) | TOTAL DISPERSION SLOPE (ps/nm²) | INSERTION LOSS (dB) | ACCOMMODATION STATE OF FIBER | INNER DIAMETER OF COIL (mm) | OUTER DIAMETER OF COIL (mm) | HOUSING SIZE(mm) LONG | HOUSING SIZE(mm) WIDE | HOUSING SIZE(mm) HIGH |
|---|---|---|---|---|---|---|---|---|---|---|---|---|---|
| SAMPLE M1 | F1 | 1.7 | 80 | 140 | -300 | -0.13 | 3.3 | RESIN HOLD | 40 | | 120 | 120 | 18 |
| SAMPLE M2 | F1 | 1.7 | 125 | 185 | -300 | -0.13 | 3.3 | RESIN HOLD | 40 | | 120 | 120 | 18 |
| SAMPLE M3 | F1 | 3.4 | 125 | 185 | -600 | -0.26 | 4.6 | RESIN HOLD | 40 | | 130 | 130 | 17 |
| SAMPLE M4 | F2 | 0.30 | 80 | 185 | -80 | -0.08 | 2.1 | RESIN HOLD | 60 | | 100 | 100 | 14 |
| SAMPLE M5 | F2 | 1.14 | 125 | 185 | -300 | -0.31 | 2.8 | RESIN HOLD | 60 | | 120 | 120 | 18 |
| SAMPLE M6 | F2 | 2.28 | 125 | 185 | -600 | -0.63 | 3.7 | RESIN HOLD | 60 | | 130 | 130 | 17 |
| SAMPLE M7 | F2 | 4.56 | 125 | 185 | -1200 | -1.26 | 5.6 | RESIN HOLD | 60 | | 170 | 170 | 17 |
| SAMPLE M8 | F2 F3 F2+F3 | 2.30 10.8 | 125 125 | 185 185 | -604 -756 -1360 | -0.63 -3.88 -4.5 | 7 | RESIN HOLD RESIN HOLD | 40 120 | 200 | 220 | 230 | 40 |

Fig.12

| DISPERSION COMPENSATING OPTICAL FIBER | Δn1 (%) | Δn2 (%) | Δn3 (%) | Δn4 (%) | 2a (μm) | 2b (μm) | 2c (μm) | 2d (μm) | CHROMATIC DISPERSION AT 1550 nm (ps/nm/km) | DISPERSION SLOPE AT 1550 nm (ps/nm²/km) | DISPERSION CURVATURE (ps/nm³/km) | RDS AT 1550 nm (1/nm) | RDC AT 1550 nm (1/nm²) | EFFECTIVE CUTOFF WAVELENGTH (μm) | BENDING LOSS WITH BENDING DIAMETER OF 40 mm AT 1550 nm (dB) | BENDING LOSS WITH BENDING DIAMETER OF 60 mm AT 1550 nm (dB) |
|---|---|---|---|---|---|---|---|---|---|---|---|---|---|---|---|---|
| SAMPLE F4 | 2.8 | -0.74 | 0.32 | - | 3.2 | 7.7 | 15.4 | - | -263 | -0.28 | 0.0129 | 0.0010 | -4.90E-05 | 1.45 | ≤0.05 | ≤0.01 |
| SAMPLE F5 | 2.7 | -0.76 | 0.31 | - | 3 | 7.4 | 14.8 | - | -299 | -0.31 | 0.0256 | 0.0010 | -8.59E-05 | 1.61 | ≤0.05 | ≤0.01 |
| SAMPLE F6 | 2.7 | -0.78 | 0.42 | - | 2.9 | 7.3 | 13.2 | - | -321 | -0.94 | 0.0460 | 0.0029 | -1.43E-04 | 1.70 | ≤0.1 | ≤0.01 |
| SAMPLE F7 | 1.6 | -0.5 | 0.3 | - | 4.2 | 11.7 | 16 | - | -82 | -0.60 | -0.0066 | 0.0074 | 8.05E-05 | 1.40 | ≤0.5 | ≤0.02 |
| SAMPLE F8 | 1.6 | -0.5 | 0.3 | - | 4.3 | 10.9 | 15.2 | - | -71 | -0.38 | -0.0038 | 0.0054 | 5.34E-05 | 1.40 | ≤0.5 | ≤0.02 |
| SAMPLE F9 | 1.6 | -0.77 | 0.41 | -0.38 | 1.7 | 5.7 | 9.2 | 11.4 | -184 | -3.70 | -0.0670 | 0.0201 | 3.65E-04 | 1.62 | ≤2.0 | ≤0.05 |
| SAMPLE F10 | 2.6 | -0.77 | 0.42 | - | 2.9 | 7.1 | 13.2 | - | -329 | 1.10 | 0.0479 | -0.0033 | -1.45E-04 | 1.72 | ≤0.1 | ≤0.01 |
| SAMPLE F11 | 2.7 | -0.76 | 0.31 | - | 2.87 | 6.88 | 14.3 | - | -329 | -0.58 | 0.0276 | 0.0018 | -8.41E-05 | 1.58 | ≤0.05 | ≤0.01 |
| SAMPLE F12 | 2.7 | -0.76 | 0.31 | - | 2.85 | 6.86 | 14.4 | - | -338 | -0.04 | 0.0423 | 0.0001 | -1.25E-04 | 1.58 | ≤0.05 | ≤0.01 |
| SAMPLE F13 | 1.6 | -0.5 | 0.3 | - | 4.2 | 11.4 | 16.1 | - | -76 | -0.49 | -0.0049 | 0.0065 | 6.54E-05 | 1.40 | ≤0.5 | ≤0.02 |
| SAMPLE F14 | 2.2 | -0.72 | 0.3 | - | 3.58 | 10.6 | 17.5 | - | -166 | -3.03 | -0.0881 | 0.0182 | 5.30E-04 | 1.57 | ≤5.0 | ≤0.05 |

| TRANSMISSION FIBER | CHROMATIC DISPERSION AT 1550 nm (ps/nm/km) | DISPERSION SLOPE AT 1550 nm (ps/nm²/km) | DISPERSION CURVATURE (ps/nm³/km) | RDS AT 1550 nm (1/nm) | RDC AT 1550 nm (1/nm²) |
|---|---|---|---|---|---|
| SAMPLE F15 | 17.0 | 0.059 | -8.94E-05 | 0.0035 | -5.27E-06 |
| SAMPLE F16 | 8.0 | 0.060 | -2.58E-05 | 0.0075 | -3.21E-06 |
| SAMPLE F17 | 4.5 | 0.044 | 4.09E-05 | 0.0098 | 9.11E-06 |

Fig.14

| DISPERSION COMPENSATOR | PREPARED FIBER | FIBER LENGTH (km) | GLASS DIAMETER (μm) | COATING DIAMETER (μm) | TOTAL CHROMATIC DISPERSION (ps/nm/km) | TOTAL DISPERSION SLOPE (ps/nm²/km) | TOTAL DISPERSION CURVATURE (ps/nm³/km) | RDS (1/nm) | RDC (1/nm²) | INSERTION LOSS (dB) | PMD (ps) | NONLINEAR PHASE SHIFT (10⁻⁴) | ACCOMMODATION STATE OF FIBER | INNER DIAMETER OF COIL (mm) |
|---|---|---|---|---|---|---|---|---|---|---|---|---|---|---|
| SAMPLE M9 | F4 | 3.94 | 125 | 185 | | | | | | | | 3.51 | RESIN HOLD | 40 |
| | F7 | 8.03 | 125 | 185 | | | | | | | | 1.81 | RESIN HOLD | 120 |
| | F1+F7 | | | | -1694 | -5.94 | -0.0024 | 0.0035 | 1.42E-06 | 7.90 | 0.49 | 5.32 | | |
| SAMPLE M10 | F5 | 2.00 | 125 | 185 | | | | | | | | 1.53 | RESIN HOLD | 40 |
| | F8 | 10.73 | 125 | 185 | | | | | | | | 2.73 | RESIN HOLD | 120 |
| | F5+F8 | | | | -1356 | -4.69 | 0.0107 | 0.0035 | -7.88E-06 | 6.95 | 0.43 | 4.26 | | |
| SAMPLE M11 | F6 | 1.84 | 125 | 185 | | | | | | | | 0.68 | RESIN HOLD | 60 |
| | F9 | 1.15 | 150 | 195 | | | | | | | | 0.24 | RESIN HOLD | 160 |
| | F6+F9 | | | | -802 | -5.99 | 0.0076 | 0.0075 | -9.48E-06 | 3.70 | 0.29 | 0.92 | | |
| SAMPLE M12 | F6 | 0.82 | 125 | 185 | | | | | | | | 0.26 | RESIN HOLD | 60 |
| | F9 | 0.99 | 150 | 195 | | | | | | | | 0.21 | RESIN HOLD | 160 |
| | F6+F9 | | | | -447 | -4.45 | -0.0286 | 0.0100 | 6.40E-05 | 2.62 | 0.21 | 0.47 | | |

Fig.22

| FIRST OPTICAL FIBER | | | SECOND OPTICAL FIBER | | | DISPERSION COMPENSATOR | | | OPTICAL TRANSMISSION LINE | |
|---|---|---|---|---|---|---|---|---|---|---|
| SAMPLE | RDS1 (1/nm) | RDC1 (1/nm²) | SAMPLE | RDS2 (1/nm) | RDC2 (1/nm²) | SAMPLE | RDS0 (1/nm) | RDC0 (1/nm²) | TRANSMISSION FIBER | RESIDUAL DISPERSION (ps/nm/km) |
| F4 | 0.0010 | -4.90E-05 | F7 | 0.0074 | 8.05E-05 | M9 | 0.0035 | 1.42E-06 | F15 | ±0.0086 |
| F5 | 0.0010 | -8.59E-05 | F8 | 0.0054 | 5.34E-05 | M10 | 0.0035 | -7.88E-06 | F15 | ±0.0056 |
| F4 | 0.0010 | -4.90E-05 | F13 | 0.0065 | 6.54E-05 | M13 | 0.0035 | 2.31E-06 | F15 | ±0.0100 |
| F10 | -0.0033 | -1.45E-04 | F13 | 0.0065 | 6.54E-05 | M14 | 0.0035 | -6.17E-07 | F15 | ±0.0056 |
| F6 | 0.0029 | -1.43E-04 | F9 | 0.0201 | 3.65E-04 | M11 | 0.0075 | -9.48E-06 | F16 | ±0.0050 |
| F5 | 0.0010 | -8.59E-05 | F9 | 0.0201 | 3.65E-04 | M15 | 0.0076 | 6.86E-05 | F16 | ±0.0477 |
| F11 | 0.0018 | -8.41E-05 | F9 | 0.0201 | 3.65E-04 | M16 | 0.0077 | 6.10E-05 | F16 | ±0.0438 |
| F12 | 0.0001 | -1.25E-04 | F9 | 0.0201 | 3.65E-04 | M17 | 0.0076 | 5.71E-05 | F16 | ±0.0374 |
| F6 | 0.0029 | -1.43E-04 | F14 | 0.0182 | 5.30E-04 | M18 | 0.0073 | 5.05E-05 | F16 | ±0.0277 |
| F6 | 0.0029 | -1.43E-04 | F9 | 0.0201 | 3.65E-04 | M12 | 0.0099 | 6.42E-05 | F17 | ±0.0186 |

OPTICAL FIBER, DISPERSION COMPENSATOR, OPTICAL TRANSMISSION LINE AND OPTICAL COMMUNICATIONS SYSTEM

BACKGROUND OF THE INVENTION

1. Field of the Invention

The present invention relates to a dispersion compensator which is used to compensate for the chromatic dispersion of a transmission optical fiber used in wavelength division multiplexing (WDM) optical transmission, an optical fiber which can be used in this dispersion compensator, an optical transmission line including the dispersion compensator, and an optical communications system including the optical transmission line.

2. Related Background Art (Reference 1) A dispersion compensator which compensates for the chromatic dispersion of transmission optical fibers in the wavelength band of 1530 to 1610 nm is disclosed in L. V. Jorgensen et al., Next Generation Dispersion Compensating Modules for 40 GBit/s, Proceedings of NFOEC2002, USA, September 2002, pp. 1171–1182.

In cases where the chromatic dispersion of a transmission optical fiber is compensated for by means of such a dispersion compensator, the chromatic dispersion profile (defined by the orthogonal coordinate system of the wavelength and chromatic dispersion) of the overall optical transmission line including the transmission optical fiber and dispersion compensator has a portion that bulges in the plus direction and a portion that bulges in the minus portion as seen from the direct axis of chromatic dispersion, so that two extreme values are adopted with respect to the wavelength.

Furthermore, in a WDM optical communications system, signal light in which a plurality of channels of different wavelengths are multiplexed is transmitted via the optical transmission line, thus allowing the high-speed transmission and reception of a large volume of information. In order to obtain high-quality signal transmission in such a WDM optical communications system, it is necessary that the absolute value of the cumulative chromatic dispersion of the signal transmission line extending from the optical transmitter to the optical receiver be small over the entire signal wavelength band.

Transmission optical fibers used in the transmission lines of the optical communications system have a predetermined amount of chromatic dispersion in the signal wavelength band. Accordingly, a dispersion compensator which compensates for the chromatic dispersion of such transmission optical fibers is inserted into the signal transmission line. Specifically, since common transmission optical fibers have a positive chromatic dispersion, a dispersion compensator which has a negative chromatic dispersion is utilized. For example, a dispersion compensating optical fiber can be used as such a dispersion compensator. Furthermore, in order to compensate for dispersion in a broad wavelength region, studies have been conducted in which compensation is made not only for the chromatic dispersion, but also for the dispersion slope. For example, in the optical communications system described in U.S. Pat. No. 6,393,188, a reduction in the absolute value of the cumulative chromatic dispersion over the entire signal wavelength band is achieved for the entire optical transmission line, including the optical transmission fiber and dispersion compensator (dispersion compensating optical fiber).

SUMMARY OF THE INVENTION

As a result of an investigation of the prior art, the present inventor discovered the following problems:

Specifically, in order to realized a further expansion of the transmission volume and a high bit rate in optical communications, it is necessary to compensate more precisely for the chromatic dispersion of the transmission optical fiber in a broad wavelength band using a dispersion compensating optical fiber.

However, even if complete compensation for both the chromatic dispersion and the dispersion slope can be made at certain wavelengths within the signal wavelength band, in the case of other wavelengths, e.g., wavelengths at both ends of the signal wavelength band, a sufficient reduction in the absolute value of the cumulative chromatic dispersion for the optical transmission line as a whole cannot be obtained.

The present invention was devised in order to eliminate the above-mentioned problems; it is an object of the present invention to provide a dispersion compensator which can compensate more precisely for the chromatic dispersion of an transmission optical fiber over a broad wavelength band, an optical fiber which can be used in this dispersion compensator, an optical transmission line including the optical compensator, and an optical communications system including the optical transmission line, and which allows higher-quality WDM optical transmission.

In general, the chromatic dispersion profile (defined by the wavelength and chromatic dispersion value) of a transmission optical fiber such as a single-mode fiber or the like has a shape in which the chromatic dispersion on this chromatic dispersion profile is located on the plus side with respect to the chromatic dispersion values on a reference line connecting the chromatic dispersion values at the shortest wavelength and longest wavelength in a predetermined wavelength band. This profile shape is also the same in conventional dispersion compensating optical fibers. Accordingly, the present inventors discovered that the chromatic dispersion of a transmission optical fiber can be more appropriately compensated for by utilizing a dispersion compensating optical fiber with a chromatic dispersion profile having a shape in which the chromatic dispersion values on the chromatic dispersion profile are located on the minus side with respect to the chromatic dispersion values on the reference line connecting the chromatic dispersion values at the shortest wavelength and longest wavelength in a predetermined wavelength band, than by utilizing a conventional dispersion compensating optical fiber. This discovery led to the perfection of the present invention.

The optical fiber according to the present invention has a chromatic dispersion of −100 ps/nm/km or less, preferably −200 ps/nm/km or less, in one of the wavelength bands of 1535 to 1565 nm, 1565 to 1610 nm, 1554 to 1608 nm, and 1535 to 1610 nm.

In particular, over the entire wavelength band described above, except for the shortest wavelength and longest wavelength, the chromatic dispersion profile of the fundamental mode defined by the orthogonal coordinate system of the wavelength and chromatic dispersion value has a shape in which the chromatic dispersion values on this chromatic dispersion profile are respectively located on the minus side with respect to the associated chromatic dispersion values on a straight line connecting the dispersion values at the shortest and longest wavelength. Here, the chromatic dispersion values on the reference line associated with the chromatic dispersion values on the dispersion chromatic profile refer to chromatic dispersion values on the reference line at the same wavelengths as the wavelengths λ of the chromatic dispersion values on the dispersion chromatic profile. Specifically, as seen from the dispersion chromatic axis, the chromatic dispersion values on the chromatic dispersion profile at these wavelengths λ are located more on the minus side than the associated chromatic dispersion values on the reference line (i.e., chromatic dispersion values on the reference line at the same wavelengths λ).

Furthermore, it is desirable that the optical fiber according to the present invention have a negative dispersion slope throughout the entire wavelength band described above. Moreover, it is desirable that the chromatic dispersion have a minimum value at any wavelength in the wavelength band except for the shortest wavelength and longest wavelength. In addition, it is desirable that the optical fiber has a transmission loss in which the amount of increase is 0.1 dB/km or less at a wavelength of 1550 nm in a case where the fiber is wound at an internal diameter of 60 mm.

The dispersion compensator according to the present invention comprises an optical fiber which has the above-mentioned structure (the optical fiber according to the present invention), and a housing which accommodates this optical fiber. Furthermore, it is desirable that this optical fiber be accommodated inside the housing in a state in which the optical fiber is wound into a coil form with a internal diameter of 40 to 100 mm.

Furthermore, the dispersion compensator according to the present invention may also comprise a separate optical fiber which is accommodated inside the housing in a state in which this separate optical fiber is connected to the optical fiber. In this case, this separate optical fiber may have a dispersion slope of $-0.2$ ps/nm$^2$/km or less, preferably $-0.5$ ps/nm$^2$/km or less, at a wavelength of 1550 nm.

The optical transmission line according to the present invention comprises a dispersion compensator which has the structure described above (the dispersion compensator according to the present invention), and a transmission optical fiber which is connected to this dispersion compensator. This transmission optical fiber has a positive chromatic dispersion in the wavelength band of 1535 to 1610 nm.

Furthermore, in the present specification, in cases where light with a wavelength of λ is propagate through an optical fiber with a length of L at a propagation time of T(λ), the chromatic dispersion D of this optical fiber is defined as $(1/L) \times (\partial T/\partial \lambda)$. The dispersion slope S is defined as $(\partial^2 T/\partial^2 \lambda)$. The total chromatic dispersion is defined as D×L, and the total dispersion slope is defined as S×L.

Furthermore, in the optical fiber according to the present invention, the chromatic dispersion profile of the chromatic dispersion D in the range of the wavelength band $\lambda_1$ to $\lambda_2$ ($\lambda_1 < \lambda_2$) has a shape which is such that the chromatic dispersion D(λ) is located on the minus side of a reference line connecting $D(\lambda_1)$ and $D(\lambda_2)$ in the wavelength range of $\lambda_1 < \lambda < \lambda_2$, i.e., a shape which satisfies the condition $D(\lambda) < D(\lambda_1) + ((D(\lambda_2) - D(\lambda_1))/(\lambda_2 - \lambda_1)) \times (\lambda - \lambda_1)$, where D(λ) is taken as the Y-axis, and λ is taken as the X-axis.

Meanwhile, the chromatic dispersion profile that is the opposite of the chromatic dispersion profile of the optical fiber has a shape which is such that the chromatic dispersion D(λ) is located on the plus side of a reference line connecting $D(\lambda_1)$ and $D(\lambda_2)$ in the wavelength range of $\lambda_1 < \lambda < \lambda_2$, i.e., a shape which satisfies the condition $D(\lambda) > D(\lambda_1) + ((D(\lambda_2) - D(\lambda_1))/(\lambda_2 - \lambda_1)) \times (\lambda - \lambda_1)$, where D(λ) is taken as the Y-axis, and λ is taken as the X-axis.

The dispersion compensator according to the present invention may comprise N optical fibers (N is an integer of 2 or more) which are cascade-connected to each other. In this case, at least some of the N optical fibers are first optical fibers which have predetermined chromatic dispersion characteristics, and the remaining optical fibers are second optical fibers which have chromatic dispersion characteristics that are the opposite of those of the first optical fibers. At least the first optical fibers have a chromatic dispersion of $-100$ ps/nm/km or less, preferably $-200$ ps/nm/km or less, in a used wavelength region with a band width of 30 nm or more within the wavelength band of 1535 to 1610 nm. Furthermore, throughout the entire wavelength band described above, except for the shortest wavelength and the longest wavelength, the chromatic dispersion profile of the fundamental mode of the first optical fibers defined by the orthogonal coordinate system of the wavelength and the chromatic dispersion values has a shape which is such that the chromatic dispersion values on this chromatic dispersion profile are respectively located on the minus side with respect to the associated chromatic dispersion values on a straight line connecting the chromatic dispersion value at the shortest wavelength and the chromatic dispersion value at the longest wavelength (i.e., the dispersion curvature of the first optical fibers is positive). On the other hand, throughout the entire wavelength band described above, except for the shortest wavelength and the longest wavelength, the chromatic dispersion profile of the fundamental mode of the second optical fibers defined by the orthogonal coordinate system of the wavelength and the chromatic dispersion values has a shape which is such that the chromatic dispersion values on this chromatic dispersion profile are respectively located on the plus side with respect to the associated chromatic dispersion values on a straight line connecting the chromatic dispersion value at the shortest wavelength and the chromatic dispersion value at the longest wavelength (i.e., the dispersion curvature of the second optical fibers is negative).

In particular, in the dispersion compensator according to the present invention, it is desirable that the absolute value of the RDC value defined by the following equation (1) be $10^{-4}$/nm$^2$ or less, where $L_n$ (km) is the length of the nth optical fiber ($1 \leq n \leq N$) among the N optical fibers, $D_n$ (ps/nm/km) is the dispersion value of this nth optical fiber at a predetermined wavelength in the used wavelength region, and $C_n$ (ps/nm$^3$/km) is 3 dispersion curvature value of the nth optical fiber at the predetermined wavelength.

$$RDC = \frac{\sum_{n=1}^{N} C_n L_n}{\sum_{n=1}^{N} D_n L_n} \quad (1)$$

A dispersion compensator in which the absolute value of the RDC value is thus small can sufficiently compensate for the chromatic dispersion of a transmission optical fiber with a small absolute value of the RDC value over a broad wavelength band. Furthermore, the used wavelength region is the signal wavelength band in the optical communications system in which the dispersion compensator is used, e.g., the C-band. Moreover, it is sufficient if the above-mentioned conditions (and the following conditions) are satisfied at at least one wavelength within the used wavelength region; however, it is more desirable that these conditions be satisfied throughout a certain wavelength range.

As described above, the dispersion curvature of the first optical fibers (among the N optical fibers) is positive in the abovementioned used wavelength region; furthermore, the dispersion curvature of the second optical fibers (among the N optical fibers) is negative in the used wavelength region. This construction is convenient for reducing the absolute value of the RDC value.

As a first aspect of the dispersion compensator, the dispersion compensator according to the present invention preferably has an RDS of 0.0032/nm to 0.0038/nm in the used wavelength region. In this first aspect, in cases where a single-mode optical fibers defined by the international standard ITU-T G.652 is used as the transmission optical fiber, the chromatic dispersion of this transmission optical fiber can be sufficiently compensated for over a broad wavelength region.

Also, as a second aspect of the dispersion compensator, the dispersion compensator according to the present invention may have an RDS of 0.0068/nm to 0.0082/nm in the used wavelength region. In this second aspect, in cases where a PureGuide (registered trademark), among non-zero dispersion shifted optical fibers defined by ITU-T G.655, is used as the transmission optical fiber, the chromatic dispersion of this transmission optical fiber can be sufficiently compensated for over a broad wavelength region.

Furthermore, as a third aspect of the dispersion compensator, the dispersion compensator according to the present invention may have an RDS of 0.009/nm to 0.011/nm in the used wavelength region. In this third aspect, in cases where a TrueWave-RS (registered trademark), among non-zero dispersion shifted optical fibers defined by ITU-T G.655, is used as the transmission optical fiber, the chromatic dispersion of this transmission optical fiber can be sufficiently compensated for over a broad wavelength region.

It is desirable that the dispersion compensator according to the present invention have an insertion loss α (dB) of "−0.005×(total chromatic dispersion (ps/nm))+1.1" or less in the used wavelength region.

Next, a first embodiment of the optical transmission line according to the present invention comprises a transmission optical fiber which transmits signal light of a plurality of channels of different wavelengths, and the dispersion compensator of the first aspect which compensates for the optical dispersion of this transmission optical fiber. In this case, it is desirable that the difference between the respective RDS values of the transmission optical fiber and the dispersion compensator be 0.0003/nm or less. Furthermore, in the dispersion compensator of this first aspect, it is desirable that the absolute value of the total chromatic dispersion throughout the used wavelength region be 0.01 ps/nm/km or less.

A second embodiment of the optical transmission line according to the present invention may comprise a transmission optical fiber which transmits signal light of a plurality of channels of different wavelengths, and the dispersion compensator of the second aspect which compensates for the chromatic dispersion of this transmission optical fiber. In this case, it is desirable that the difference between the respective RDS values of the transmission optical fiber and the dispersion compensator be 0.0007/nm or less. Additionally, it is desirable that the absolute value of the total chromatic dispersion throughout the used wavelength region be 0.05 ps/nm/km or less.

A third embodiment of the optical transmission line according to the present invention may comprise a transmission optical fiber which transmits signal light of a plurality of channels of different wavelengths, and the dispersion compensator of the third aspect which compensates for the chromatic dispersion of this transmission optical fiber. In this case, it is desirable that the difference between the respective RDS values of the transmission optical fiber and the dispersion compensator be 0.001/nm or less. Further, it is desirable that the absolute value of the total chromatic dispersion throughout the used wavelength region be 0.02 ps/nm/km or less.

A fourth embodiment of the optical transmission line according to the present invention may comprise a transmission optical fiber which has an RDS of 0.0032/nm to 0.0038/nm at a predetermined wavelength in a used wavelength region with a band width of 30 nm or more included in the wavelength band of 1535 nm to 1610 nm, and a dispersion compensator which compensates for the chromatic dispersion of this transmission optical fiber. In this case, it is desirable that the difference between the respective RDS values of the transmission optical fiber and the dispersion compensator at the predetermined wavelength be 0.0003/nm or less. Furthermore, it is desirable that the absolute value of the total chromatic dispersion throughout the used wavelength region be 0.01 ps/nm/km or less.

A fifth embodiment of the transmission line according to the present invention may comprise a transmission optical fiber which has an RDS of 0.0068/nm to 0.0082/nm at a predetermined wavelength in a used wavelength region with a band width of 30 nm or more included in the wavelength band of 1535 nm to 1610 nm, and a dispersion compensator which compensates for the chromatic dispersion of this transmission optical fiber. In this case, it is desirable that the difference between the respective RDS values of the transmission optical fiber and the dispersion compensator at the predetermined wavelength be 0.0007/nm or less. Also, it is desirable that the absolute value of the total chromatic dispersion throughout the used wavelength region be 0.05 ps/nm/km or less.

A sixth embodiment of the optical transmission line according to the present invention may comprise a transmission optical fiber which has an RDS of 0.009/nm to 0.011/nm at a predetermined wavelength in a used wavelength region with a band width of 30 nm or more included in the wavelength band of 1535 nm to 1610 nm, and a dispersion compensator which compensates for the chromatic dispersion of this transmission optical fiber. In this case, it is desirable that the difference between the respective RDS values of the transmission optical fiber and the dispersion compensator at the predetermined wavelength be 0.001/nm or less. And, it is desirable that the absolute value of the total chromatic dispersion throughout the used wavelength region be 0.019 ps/nm/km or less.

In the optical transmission lines of the fourth through sixth embodiments, it is desirable that the used wavelength region includes the wavelength range of 1535 to 1565 nm.

In all of the optical transmission lines according to the first through sixth embodiments, the absolute value of the total chromatic dispersion can be sufficiently reduced over a broad wavelength region. Furthermore, the optical transmission lines according to the first and fourth embodiments include a single-mode optical fiber defined by ITU-T G.652 as a transmission optical fiber. The optical transmission lines according to the second and fifth embodiments include PureGuide (registered trademark), among non-zero dispersion shifted optical fibers defined by ITU-T G.655, as a transmission optical fiber. On the other hand, the optical transmission lines according to the third and sixth embodiments include a TrueWave-RS (registered trademark), among non-zero dispersion shifted optical fibers defined by ITU-T G.655, as a transmission optical fiber.

The optical communications system according to the present invention transmits signal light of a plurality of channels of different wavelengths via one of the optical transmission lines according to the first through sixth embodiments. Since this optical communications system transmits signal via the optical transmission lines in which the absolute value of the chromatic dispersion is sufficiently small over a broad wavelength region, high-quality transmission of the signal light of a plurality of channels is possible.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2A is a sectional view showing the structure of the dispersion compensating optical fiber having the chromatic dispersion characteristics shown in FIG. 1; whereas

FIG. 3A is a perspective view of the dispersion compensator according to the present invention, whereas FIG. 3B is a sectional view of this dispersion compensator along line I—I in FIG. 3A;

FIG. 6 is a table showing the optical characteristics of samples F1 and F2 prepared as optical fibers according to the present invention, and of comparative example F3;

FIG. 7 is a table showing the optical characteristics of samples M1 through M8 of the dispersion compensator according to the present invention;

FIG. 12 is a table summarizing the respective specifications of samples F4 through F14 of optical fibers (optical fibers according to the present invention) that can be used in the dispersion compensator according to the present invention, and samples F15 through F17 of optical fibers that can be used as transmission optical fibers;

FIG. 13A is a graph showing the cross-sectional structure of an optical fiber that can be used in the dispersion compensator according to the present invention, whereas

FIG. 14 is a table summarizing the respective specifications of samples M9 through M12 of the dispersion compensator according to the present invention;

FIG. 22 is a table summarizing the construction of the dispersion compensators of samples M9 through M18, and the specifications of optical transmission lines including these dispersion compensators;

DESCRIPTION OF THE PREFERRED EMBODIMENTS

Respective embodiments of the optical fiber, dispersion compensator, optical transmission line and optical communications system according to the present invention will be described in detail below with reference to FIGS. 1, 2A, 3B, 4 through 12, 13A, 13B and 14 through 26. Furthermore, in the description of the figures, the same symbols are assigned to the same or corresponding elements, and a redundant description is omitted.

Figure 1:
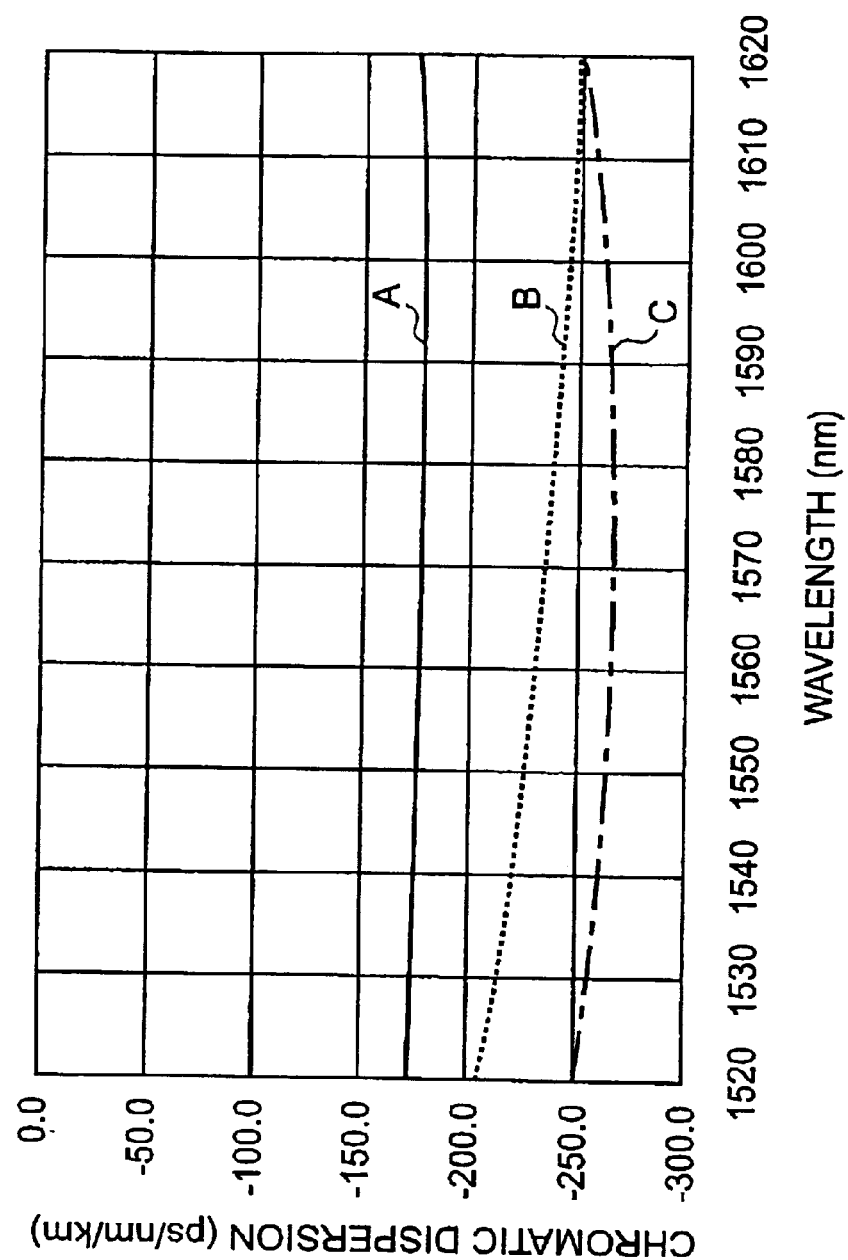
FIG. 1 is a graph showing chromatic dispersion characteristics of the dispersion compensating optical fiber used as the optical fiber according to the present invention.

First, the dispersion compensating optical fiber as the optical fiber according to the present invention will be described. FIG. 1 is a graph showing the respective chromatic dispersion characteristics of dispersion compensating optical fibers A, B and C constituting optical fibers according to invention. In these dispersion compensating optical fibers A, B and C, as shown in FIG. 1, the chromatic dispersion profile of the fundamental mode has a shape that bulges downward in a broad wavelength band from 1520 to 1620 nm; furthermore, the chromatic dispersion in these optical fibers is −100 ps/nm/km or less. Specifically, in each of the dispersion compensating optical fibers A, B and C, throughout the entire wavelength band described above (except for the shortest wavelength (1520 nm) and the longest wavelength (1620 nm)), the chromatic dispersion profile of the fundamental mode defined by the orthogonal coordinate system of the wavelength and chromatic dispersion values has a shape which is such that the chromatic dispersion values on this chromatic dispersion profile are respectively located on the minus side with respect to the associated chromatic dispersion values on a straight line connecting the chromatic dispersion value at the shortest wavelength and the chromatic dispersion value at the above-mentioned longest wavelength.

Here, this wavelength band from 1520 to 1620 nm includes the C-band (band width 1535 to 1565 nm), L-band (band width 1565 to 1610 nm), expanded L-band (band width 1554 to 1608 nm) and C- and L-band (band width 1535 to 1610 nm).

The chromatic dispersion profile of the fundamental mode in a conventional transmission optical fiber such as a single-mode fiber or the like has a shape which bulges in the plus direction with respect to the reference line as seen from the chromatic dispersion value axis (i.e., a shape which bulges in the opposite direction from the chromatic dispersion profile of the dispersion compensating optical fibers A, B and C); accordingly, if the chromatic dispersion of an optical transmission line is compensated for utilizing a conventional dispersion compensating fiber in which the chromatic dispersion profile has a shape that bulges in the plus direction in the respective bands as seen from the chromatic dispersion value axis, the chromatic dispersion profile of the optical transmission line as a whole will also have a shape that bulges in the plus direction as seen from the chromatic dispersion value axis, so that appropriate compensation for dispersion may be impossible in some cases.

However, the optical fibers according to invention (dispersion compensating fibers A, B and C) all have a negative chromatic dispersion in the respective bands mentioned above, and in these optical fibers, the chromatic dispersion profile of the fundamental mode has a shape that bulges in the minus direction as seen from the chromatic dispersion value axis; accordingly, appropriate compensation for the chromatic dispersion of the optical transmission line is possible.

As described above, the dispersion compensating optical fibers A, B and C have a negative chromatic dispersion (−100 ps/nm/km or less, and preferably −200 ps/nm/km or less) over a broad wavelength band of 1520 to 1620 nm; furthermore, the chromatic dispersion profiles of these optical fibers have a shape that bulges in the minus direction as seen from the chromatic dispersion value axis. However, in accordance with the used wavelength region of the transmission optical fiber, these dispersion compensating optical fibers A, B and C may also have a negative chromatic dispersion in the C-band only, L-band only, expanded L-band only or C- and L-band only, and the chromatic dispersion profile may have a shape that bulges in the minus direction as seen as seen from the chromatic dispersion value axis.

In regard to dispersion compensation for transmission optical fibers using such dispersion compensating optical fibers, there is first of all dispersion compensation in which the absolute value of the chromatic dispersion of the optical transmission line as a whole is reduced more or less to a value of zero throughout the respective bands after dispersion compensation (including the dispersion slope) is performed in the respective bands. Secondly, there is dispersion compensation in which the absolute value of the chromatic dispersion of the optical transmission line is reduced throughout the respective bands with the dispersion slope left "as is".

Next, dispersion compensating optical fibers that are more desirable in cases where the first and second types of dispersion compensation are performed will be described.

First of all, in regard to the first dispersion compensation, appropriate conditions for the dispersion compensating optical fiber used in cases where compensation is made for the chromatic dispersion of the optical transmission line (including the dispersion slope) will be described.

By connecting only the dispersion compensating optical fiber according to invention to the transmission optical fiber, it is possible to reduce the chromatic dispersion of the optical transmission line including the dispersion compensating optical fiber and transmission optical fiber more or less to a value of zero throughout the respective bands. In this case, it is desirable that the dispersion compensating optical fiber have a negative dispersion slope in the wavelength bands of the C-band, L-band, expanded L-band or C- and L-band as shown by the dispersion compensating optical fiber B in FIG. 1, i.e., that the dispersion compensating optical fiber have chromatic dispersion characteristics which are such that the chromatic dispersion decreases monotonically as the wavelength increases. In this way, appropriate compensation can be made for the chromatic dispersion of a transmission optical fiber in which the chromatic dispersion profile bulges in the plus direction (as seen from the chromatic dispersion value axis) throughout the respective bands.

Also, the chromatic dispersion of an optical transmission line including a transmission optical fiber can be compensated at about zero in each band, by combining the dispersion compensating optical fiber according to the present invention and a conventional dispersion compensating optical fiber in which the chromatic dispersion profile bulges in the plus direction as seen from the chromatic dispersion value axis. In this case as well, the dispersion compensating optical fiber according to invention may have a negative dispersion slope in the wavelength bands of the C-band, L-band, expanded L-band or C- and L-band as shown by the dispersion compensating optical fiber B in FIG. 1.

In cases where compensation is made for the chromatic dispersion of a transmission optical fiber which has a positive chromatic dispersion by combining two dispersion compensating optical fibers as described above, compensation which lowers the absolute value of the chromatic dispersion of the transmission optical fiber in the respective bands may be performed by means of a dispersion compensating optical fiber with chromatic dispersion characteristics such as those shown in FIG. 1 (i.e., the optical fiber according to invention), while the dispersion slope of the transmission optical fiber is compensated for mainly by means of the conventional dispersion compensating optical fiber. In this case, the dispersion compensating optical fibers that are used may have a wavelength which is such that the dispersion slope is zero. In other words, the minimum value of the chromatic dispersion may be outside both ends of the wavelength band as in the case of, for example, the dispersion compensation optical fibers A and C shown in FIG. 1.

In the case of the dispersion compensating optical fibers A and C shown in FIG. 1, the dispersion compensating optical fiber (i.e., the optical fiber according to the present invention) that is combined with the conventional dispersion compensating optical fiber can be shortened if the absolute value of the difference between the maximum value and minimum value of the chromatic dispersion in the respective bands is increased, so that the size of the dispersion compensator (which will be described in detail later) can be reduced, which is desirable. Here, it is desirable that the difference between the maximum value and the minimum value of the chromatic dispersion of the dispersion compensating optical fiber according to invention be 10 ps/nm/km or more. In concrete terms, since the difference between the maximum value and minimum value of the chromatic dispersion is more in the case of the dispersion compensating optical fiber C shown in FIG. 1 than in the case of the dispersion compensating optical fiber A shown in FIG. 1, this optical fiber C is suitable for combination with the above-mentioned conventional dispersion compensating optical fiber.

Reducing the residual chromatic dispersion in the C- and L-band of an optical transmission line with a length of 120 km to a small value of, for example, approximately 0.2 ps/nm/km or less by connecting a conventional dispersion compensating optical fiber to the transmission optical fiber has been difficult in the past. Here, the residual chromatic dispersion of a certain wavelength band refers to the absolute value of the difference between the maximum value and minimum value of the chromatic dispersion in this wavelength band.

However, if the chromatic dispersion of the optical transmission line as a whole is compensated for by connecting a hybrid dispersion compensating optical fiber combining the dispersion compensating optical fiber according to invention and a conventional dispersion compensating optical fiber to the transmission optical fiber, then the chromatic dispersion profile of the optical transmission line approaches a horizontal straight line with respect to wavelength more closely than in a conventional system.

Accordingly, in cases where the dispersion of the optical transmission line as a whole is compensated for by connecting a hybrid dispersion compensating optical fiber comprising the dispersion compensation optical fiber according to the present invention and a conventional dispersion compensating optical fiber to transmission single-mode optical fiber in which the chromatic dispersion in the C- and L-band is positive, e.g., in which the chromatic dispersion at a wavelength of 1550 nm is 16 to 21 ps/nm/km, the residual chromatic dispersion of the optical transmission line in the C- and L-band is a small value not seen in the past, e.g., 0.2 ps/nm/km or less.

I an optical transmission line is constructed by connecting a hybrid dispersion compensating optical fiber comprising the dispersion compensating optical fiber according to invention and a conventional dispersion compensating optical fiber to a transmission single-mode optical fiber with a length of 100 km, the residual chromatic dispersion can be reduced to a value of 0.2 ps/nm/km or less in the wavelength bands of the C-band, L-band, expanded L-band or C- and L-band. In the case of such an optical transmission line, signal transmission at a transmission rate of 40 Gbps is possible.

Next, as an example of the second dispersion compensation, a case in which the absolute value of the chromatic dispersion of the transmission optical fiber is reduced throughout the respective bands using the dispersion compensating optical fiber according to the present invention will be described.

For example, in a case where the chromatic dispersion of an optical transmission line including a short optical transmission fiber (e.g., with a length of approximately 50 km) is compensated for, it is not absolutely necessary to compensate for the dispersion slope of the optical transmission line so that the chromatic dispersion is reduced more or less to a value of zero throughout the respective bands; there are cases in which the design of the optical transmission line is easier if compensation which is such that the chromatic dispersion in the respective bands is subtracted is performed.

On the other hand, in cases where the chromatic dispersion of an optical transmission line including a long optical transmission fiber (e.g., with a length of several thousand kilometers) is compensated for, a plurality of dispersion compensators are disposed on the optical transmission line; even so, there may be cases in which a large chromatic dispersion in predetermined wavelength bands remains in the optical transmission line following compensation. In such cases, in wavelength bands in which the residual dispersion is large so that the desired propagation rate cannot be obtained, it is necessary that dispersion compensation be performed separately for these wavelength bands. In such cases as well, it is advisable to perform dispersion compensation so that the chromatic dispersion is subtracted in the individual wavelength bands.

In cases where compensation that subtracts the chromatic dispersion in the respective bands is thus performed, it is desirable that dispersion compensation be performed by connecting only the dispersion compensating optical fiber according to invention to a transmission optical fiber which has a positive chromatic dispersion.

It is desirable that the chromatic dispersion of the dispersion compensating optical fiber be flat in the respective bands. In other words, it is desirable that the absolute value of the difference between the maximum value and minimum value of the chromatic dispersion be small. For example, if the minimum value of the chromatic dispersion is outside both ends of the respective wavelength bands, the absolute value of the difference between the maximum value and minimum value of the chromatic dispersion in the respective bands can easily be reduced to a small value. In concrete terms, it is desirable that the absolute value of the difference between the maximum value and minimum value be less than 10 ps/nm/km, so that the dispersion compensating optical fiber A is more desirable than the dispersion compensating optical fiber C in FIG. 1.

It is desirable that the dispersion compensating optical fiber according to invention have chromatic dispersion characteristics which are such that the chromatic dispersion shows a minimum value at the center wavelength in each band. In this case, since the chromatic dispersion values at both ends of each band are more or less equal, the dispersion slope of the wavelength band tends to be close to zero.

Desirable conditions for the dispersion compensating optical fiber according to invention, including the first dispersion compensation and second dispersion compensation will be further described below. It is desirable that the dispersion compensating optical fiber according to invention has a chromatic dispersion of −100 ps/nm/km or less, preferably −200 ps/nm/km or less, in each band. By lowering the chromatic dispersion, it is possible to shorten the length of the dispersion compensating optical fiber required in order to compensate for the chromatic dispersion of the transmission optical fiber.

Furthermore, in the dispersion compensating optical fiber according to the present invention, it is desirable that the diameter of the glass portion including the core and cladding (hereafter referred to as the "glass diameter") be 60 to 125 μm, and that the thickness of the covering that covers this glass portion be 15 to 65 μm. If a slender optical fiber in which the diameter of the glass portion is small and the thickness of the covering is thin is used, this optical fiber can be wound to form a coil, and the volume occupied by the optical fiber in which dispersion compensator in which this coil is accommodated in a housing can be reduced.

Since the accommodation space in the relay station in which the dispersion compensator is accommodated is limited, there is a strong market demand for more compact dispersion compensators. The coating diameter of ordinarily used dispersion compensating optical fibers is 250 μm; however, the coating diameter of the dispersion compensating optical fiber according to the present invention can be reduced to approximately 90 μm.

The dispersion compensating optical fiber according to the present invention can also be bent at a bending diameter of 40 to 100 mm. By reducing the bending diameter, it is possible to reduce the volume occupied by the dispersion compensating optical fiber when this optical fiber is wound into the form of a coil, so that the size of the housing that accommodates this coil can also be reduced. Specifically, the dispersion compensator in which the dispersion compensating optical fiber according to the present invention is accommodated in a housing can be made more compact.

In the dispersion compensating optical fiber according to the present invention, even if the optical fiber is bent at a bending diameter of 60 mm, the amount of increase in the transmission loss (hereafter referred to as the "amount of increase in the bending loss") at a wavelength of 1550 nm is 0.1 dB/km or less, so that this dispersion compensating optical fiber has a superior resistance to bending.

Additionally, if the amount of increase in the bending loss at a wavelength of 1550 nm that occurs when the optical fiber is wound into a coil with a diameter of 60 mm exceeds 0.1 dB/km, this coil will have an excessive loss, and will be unsuited for practical use. However, in the case of the dispersion compensating optical fiber according to the present invention, the amount of increase in the bending loss at a wavelength of 1550 nm that occurs when the optical fiber is wound at a diameter of 60 mm can be reduced to 0.1 dB/km or less. Furthermore, the amount of increase in the bending loss at a wavelength of 1550 nm can also be reduced to 0.1 dB/km or less in cases where the dispersion compensating optical fiber is wound at a diameter of 40 mm. Moreover, in the dispersion compensating optical fiber according to the present invention, the effective cutoff wavelength can be reduced to 1.53 μm or less in cases where the wavelength band of the C- and L-band is used.

Figure 2A:
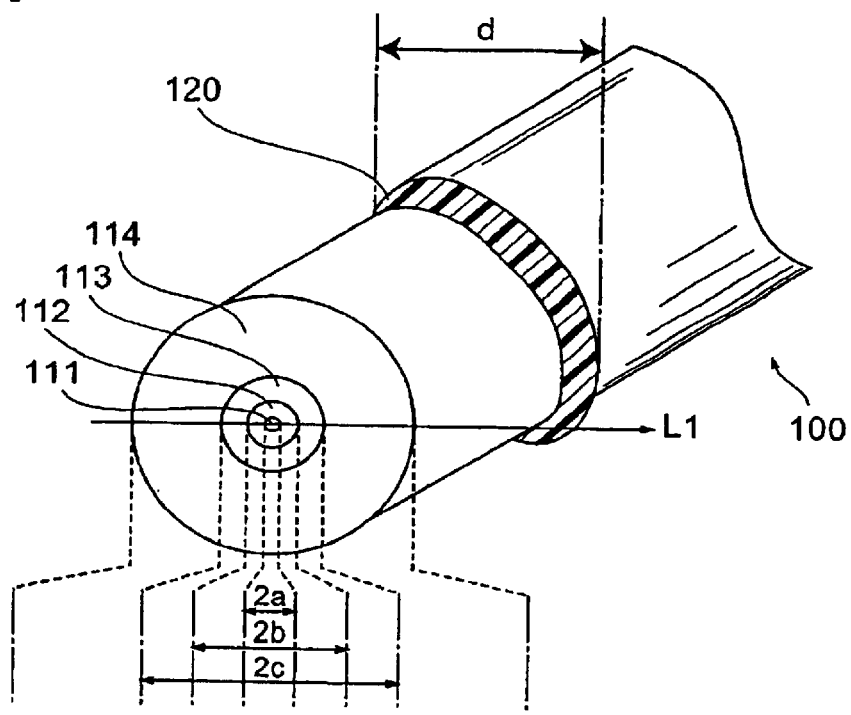
Figure 2B:
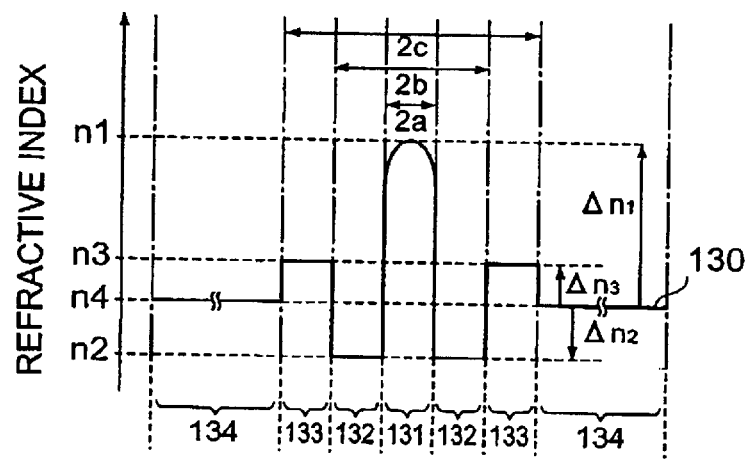
FIG. 2B is a refractive index profile of the same.

Next, the construction and refractive index profile of the dispersion compensating optical fiber according to the present invention will be described with reference to FIGS. 2A and 2B. FIG. 2A is a sectional view showing the structure of a dispersion compensating optical fiber 100 as the optical fiber according to the present invention, and FIG. 2B shows the refractive index profile 130 of the same.

The dispersion compensating optical fiber 100 shown in FIG. 2A comprises a core 111 including an optical axis and having a refractive index of n1, a first cladding 112 surrounding the core 111 and having a refractive index of n2 lower than n1, a second cladding 113 surrounding the first cladding 112 and having a refractive index of n3 higher than n2, a third cladding 114 surrounding the second cladding 113 and having a refractive index of n4 lower than n3, and a covering layer 120 provided so as to surrounding the third cladding 114.

Here, the core diameter is designated as $2a$, the diameter of the first cladding is designated as $2b$, the diameter of the second cladding is designate as $2c$, the diameter of the third cladding (glass diameter) is designated as d, the relative refractive index difference of the core 111 with reference to the refractive index n4 of the third cladding 114 is designated as $\Delta n1$ $(=(n1-n4)/n4)$, the relative refractive index difference of the first cladding 112 with reference to the refractive index n4 of the third cladding 114 is designated as $\Delta n2$ $(=(n2-n4)/n4)$, and the relative refractive index difference of the second cladding 113 with reference to the refractive index n4 of the third cladding 114 is designated as $\Delta n3$ $(=(n3-n4)/n4)$. Furthermore, it is desirable that the relative refractive index difference $\Delta n1$ of the core 111 be 2.0 to 4.0%, and that $\Delta n2$ of the first cladding 112 be −0.2 to −0.9%. Moreover, it is desirable that $\Delta n3$ of the second cladding 113 be 0.2 to 0.9%, and that the following queen prefecture be satisfied where A is the core diameter, B is the diameter of the first cladding and C is the diameter of the second cladding:

$$0.2 \leq (A/C) < 0.4, \text{ and } 0.4 \leq (B/C) < 0.8$$

The refractive index profile 130 shown in FIG. 2B indicates the refractive index in various parts along the line L1 in FIG. 2A. In concrete terms, in the refractive index profile 130, the region 131 indicates the refractive index in various parts of the core 111 along the line L1, the region 132 indicates the refractive index in various parts of the first cladding 112 along the line L1, the region 133 indicates the refractive index in various parts of the second cladding 113 along the line L1, and the region 134 indicates the refractive index in various parts of the third cladding 114 along the line L1.

Next, the construction of the dispersion compensator according to the present invention will be described with reference to FIGS. 3A and 3B. Furthermore, FIG. 3A is a perspective view of the dispersion compensator according to the present invention, and FIG. 3B is a sectional view of this dispersion compensator along line I—I in FIG. 3A.

The dispersion compensator 19 according to the present invention is a dispersion compensator for compensating for the chromatic dispersion of a transmission optical fiber by combining the dispersion compensating optical fiber 100 (i.e., the optical fiber according to the present invention) and a conventional dispersion compensating optical fiber 3.

In this dispersion compensator 19, a coil formed by the winding of the dispersion compensating optical fiber 100 is accommodated in the center of a housing 1, and a coil formed by the winding of the conventional dispersion compensating optical fiber 3 is accommodated around the circumferential of the first coil. These coils are held by a filling material 7. In this dispersion compensator 19, the respective coils are obtained by winding the optical fibers beforehand on a bobbin, and then removing this bobbin. The coils thus obtained are held inside the housing 1 in a state in which the coils are loosened so that the lateral pressure is reduced. The two optical fibers 100 and 3 are connected to each other at one end by fusion connection effected by a fusion connection part 8. The fusion connection part 8 and the like are further held by a filling material 11 on the filling material 7.

In the manufacture of this dispersion compensator, the coil of the dispersion compensating optical fiber 100 and the coil of the conventional dispersion compensating optical fiber 3 are accommodated inside the housing 1, and the housing is then filled with the filling material 7, except for the areas at both ends of the respective optical fibers 100 and 3. Then, one end of the dispersion compensating optical fiber 100 and one end of the conventional dispersion compensating optical fiber 3 are connected by fusion. Following this fusion connection, the excess length portions 12 are maintained in the vicinity of the fusion connection part 8. Furthermore, pigtail fibers 1b which have connectors 1a attached to their end portions are connected by fusion to the other end of the dispersion compensating optical fiber 100 and the other end of the conventional dispersion compensating optical fiber 3. These pigtail fibers 1b are prepared in order to facilitate the connection of the transmission optical fiber to the dispersion compensator 19. Furthermore, these fusion connection parts 8 and 10 and excess length portions 12 are carried on the upper part of the previously hardened filling material 7. Moreover, these fusion connection parts 8 and 10 and excess length portions 12 are held by filling the interior of the housing 1 with a filling material 11 and hardening this filling material 11.

Here, the coils inside the housing 1 may be in a state in which these coils are held on bobbins, or may simply be in a tightly wound state in which the bobbins have been removed. Furthermore, in FIGS. 3A and 3B, the outer diameter of the coil of the dispersion compensating optical fiber 100 is smaller than the inner diameter of the coil of the conventional dispersion compensating optical fiber 3; however, it would also be possible to make the inner diameter of the coil of the dispersion compensating optical fiber 100 larger than the outer diameter of the conventional dispersion compensating optical fiber 3, and to dispose the conventional dispersion compensating optical fiber 3 on the inside of the dispersion compensating optical fiber 100. Furthermore, these two coils may also be stacked one above the other inside the housing 1. The dispersion compensating optical fiber 100 and the conventional dispersion compensating optical fiber 3 may also be placed in respectively separate housings.

The term "coil" is used to refer to a state in which the optical fibers 100 and 3 are wound on bobbins, a state in which the bobbins have been removed so that the optical fibers are in a tightly wound state, or a state in which the optical fibers have been loosened following the removal of the bobbins (i.e., a state in which the lateral pressure exerted by the respective optical fibers on each other is reduced).

It is desirable that the dispersion compensating optical fiber 100 used in the dispersion compensator according to the present invention be bent into the form of a coil with a bending diameter of 40 to 100 mm, preferably 40 to 80 mm, and even more preferably 40 to 60 mm. By reducing the bending diameter, it is possible to reduce the volume occupied by the dispersion compensating optical fiber when this optical fiber is wound into the form of a coil, so that the size of the housing that accommodates this coil can also be reduced. In particular, the dispersion compensator in which the dispersion compensating optical fiber is accommodated in a housing can be made more compact.

A soft resin is desirable as the filling material with which the areas around the coils and the areas inside the coils are filled. In particular, it is desirable that the penetration of the resin after hardening, which is measured by using a ¼ cone as defined by JIS K 2220-1993, be 5 to 200 in a temperature range of −20° C. to 70° C. Furthermore, it is desirable that the filling material be caused to penetrate to the interior of the coil (i.e., to fill the spaces between the windings of the optical fiber wound into coil form). If a filling material whose viscosity prior to hardening is 0.01 to 0.6 Pa-s at ordinary temperatures is used, then not only the periphery of the coil but also the spaces between the optical fiber windings can easily be filled with the filling material, so that the optical fiber windings can be individually covered by the filling material. A silicone gel or the like can be utilized as such a filling material. Furthermore, instead of a filling material, it would also be possible to install a cushioning material such as a sponge or the like on the circumferences and insides of the coils inside the housing 1.

In regard to the manner in which the interior of the housing 1 is filled with such a filling material, it is desirable that this filling be devised so that no unnecessary external force is applied to the fusion connection part 8 between the optical fibers. For example, when the filling material 11 is introduced onto the fusion connection part 8 and excess length portions 12 on top of the filling material 7, it is desirable that the angle formed by the surface of the filling material 7 and the fusion connection part 8 or excess length portions 12 of the optical fibers be 30 degrees or less. Furthermore, it is desirable that the bending diameter of the excess length portions 12 (portions of the optical fibers) around the fusion connection part 8 be, for example, 60 mm or more. Moreover, instead of using the filling material 11, it would also be possible to fasten the fusion connection part 8 and excess length portions 12 to the surface of the filling material 7.

The dispersion compensating optical fiber 100 used in such a dispersion compensator is the dispersion compensating optical fiber described above (i.e., the optical fiber according to the present invention).

As described above, it is desirable that the dispersion slope of the conventional dispersion compensating optical fiber 3 that is used in combination with the dispersion compensating optical fiber 100 has characteristics that compensate for the dispersion slope of the transmission optical fiber.

In cases where the dispersion slope of the transmission optical fiber is large, as in a non-zero dispersion shift fiber, a dispersion compensating optical fiber which has a small dispersion slope and a large total dispersion slope is desirable as the conventional dispersion compensating optical fiber 3.

For example, in cases where compensation is made for the chromatic dispersion of a non-zero dispersion shifted optical fiber through which communications light of the C-band is transmitted, such as LEAF (registered trademark) manufactured by Corning Co. or the like, it is desirable that the conventional dispersion compensating optical fiber 3 that is combined with the dispersion compensating optical fiber 100 have a dispersion slope of −0.5 ps/nm$^2$/km or less at a wavelength of 1550 nm.

On the other hand, in cases where compensation is made for the chromatic dispersion of a non-zero dispersion shifted optical fiber through which communications light of the L-band, expanded L-band or C- and L-band is transmitted, such as the LEAF or the like, it is desirable that the conventional dispersion compensating optical fiber 3 that is combined with the dispersion compensating optical fiber 100 have a dispersion slope of −0.2 ps/nm²/km or less at a wavelength of 1550 nm.

Also, in cases where compensation is made for the chromatic dispersion of transmission optical fibers other than those mentioned above, it is desirable that the conventional dispersion compensating optical fiber 3 that is combined with the dispersion compensating optical fiber 100 have a dispersion slope of −0.2 ps/nm²/km or less at a wavelength of 1550 nm.

Furthermore, in cases where compensation is made for the chromatic dispersion of a transmission optical fiber that has a positive chromatic dispersion using only the dispersion compensating optical fiber 100, a dispersion compensator with a construction in which only the coil of this dispersion compensating optical fiber 100 is accommodated inside the housing 1 may be used.

In such a dispersion compensator, in cases where compensation is made for the chromatic dispersion of a short transmission optical fiber, the length of the dispersion compensating optical fiber may be shortened. As a result, the size of the dispersion compensator can also be reduced.

For example, in cases where the total chromatic dispersion of the transmission optical fiber for which compensation is to be made is −1200 ps/nm or more but less than −600 ps/nm at a wavelength of 1550 nm, the housing volume of the dispersion compensator can be reduced to 500 cm³ or less. In this case, for example, the external dimensions of the housing 1 can be reduced to 170 mm or less (long)×170 mm or less (wide)×17 mm or less (high).

In cases where the total chromatic dispersion of the transmission optical fiber for which compensation is to be made is −600 ps/nm or more but less than 0 ps/nm at a wavelength of 1550 nm, the housing volume of the dispersion compensator can be reduced to 310 cm³ or less. In this case, for example, the external dimensions of the housing 1 can be reduced to 130 mm or less (long)×130 mm or less (wide)×17 mm or less (high).

Furthermore, in cases where the total chromatic dispersion of the transmission optical fiber for which compensation is to be made is −300 ps/nm or more but less than 0 ps/nm at a wavelength of 1550 nm, the housing volume of the dispersion compensator can be reduced to 260 cm³ or less. In this case, for example, the external dimensions of the housing 1 can be reduced to 120 mm or less (long)×120 mm or less (wide)×18 mm or less (high).

Furthermore, in cases where the total chromatic dispersion of the transmission optical fiber for which compensation is to be made is −80 ps/nm or more but less than 0 ps/nm at a wavelength of 1550 nm, the housing volume of the dispersion compensator can be reduced to 140 cm³ or less. In this case, for example, the external dimensions of the housing 1 can be reduced to 100 mm or less (long)×100 mm or less (wide)×14 mm or less (high).

In the dispersion compensator according to the present invention, as described above, since the dispersion compensating optical fiber (i.e., the optical fiber according to the present invention) is used, appropriate compensation can be made for the chromatic dispersion of a transmission optical fiber.

Next, the construction of the optical communications system 151 according to the present invention will be described with reference to FIG. 4.

Figure 4:
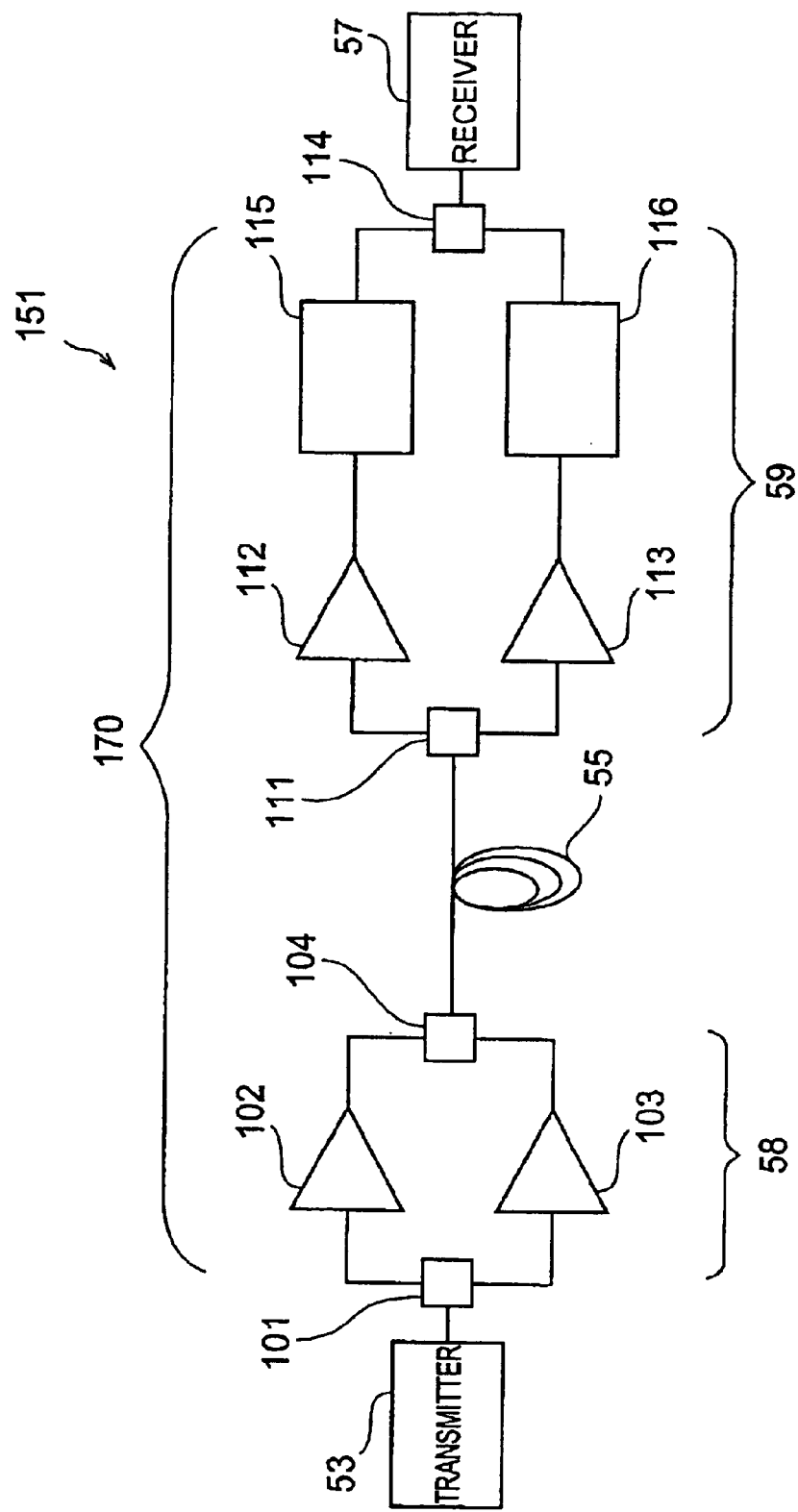
FIG. 4 is a diagram showing the construction of an optical transmission system in which the dispersion compensator shown in FIGS. 3A and 3B is used.

As shown in FIG. 4, the optical transmission system 151 comprises an optical transmission line 170 disposed on signal light transmission path extending from a transmitter 53 that outputs signal light of the C- and L-band (multiplexed signal light in which a plurality of channels are multiplexed) to a receiver 57 that receives this signal light. This optical transmission line is constructed from a transmission optical fiber 55, a relay 58 and a relay 59.

The transmission optical fiber 55 is a single mode optical fiber with chromatic dispersion profile having a shape that bulges in the plus direction as seen from the chromatic dispersion value axis in the C- and L-band, and has a positive chromatic dispersion in the C- and L-band.

The relay 58 comprises a wave divider 101 which splits the signal light from the transmitter 53 into the C-band and L-band, an optical amplifier 102 which amplified the C-band obtained by this light splitting, an optical amplifier 103 which amplifies the L-band obtained by this light splitting, and a wave synthesizer 104 which synthesizes the respective bands output from the optical amplifier 102 and optical amplifier 103, and sends the resulting synthesized wave to the transmission optical fiber 55.

The relay 59 has a wave divider 111 which splits the signal light of the C- and L-band propagated through the transmission optical fiber 55 into the C-band and L-band, an optical amplifier 112 which amplifies the C-band obtained by this light splitting, a dispersion compensator 115 having the structure described above into which the signal light amplified by the optical amplifier 112 is directed, an optical amplifier 113 which amplifies the L-band obtained by the light splitting performed by the wave divider 111, a dispersion compensator 116 having the structure described above into which the signal light amplified by the optical amplifier 113 is directed, and a wave synthesizer 114 which synthesizes the respective bands output from the dispersion compensator 115 and dispersion compensator 116, and outputs the resulting synthesized wave to the receiver 57.

For example, erbium-doped optical fibers (EDF) or the like can be utilized as these optical amplifiers 102, 103, 112 and 113.

Signal light in which a plurality of channels included in the C- and L-band are multiplexed (multiplexed signal light) is output from the transmitter 53. This signal light is amplified for the respective bands in the relay 58, and is propagated through the transmission optical fiber 55. Then, the signal light that reaches the relay 59 is again amplified for each band, and dispersion compensation is performed for each band by the dispersion compensators 115 and 116. Then, after the signal light for which dispersion compensation has been performed is synthesized, this light reaches the receiver 57. Then, the receiver 20 splits this multiplexed signal light and receives the respective channels.

In the optical transmission line 170 of the optical transmission system 151 constructed as described above, since dispersion compensators 115 and 116 have the structure described above are provided, appropriate compensation can be achieved for the chromatic dispersion of the optical transmission line 170 as a whole. Accordingly, deterioration of the signal waveform can be effectively suppressed. In concrete terms, for example, the residual chromatic dispersion of the respective bands in the optical transmission line 170 can be reduced to 0.2 ps/nm/km or less.

Furthermore, in the case of such dispersion compensators 115 and 116, it is desirable that at least one dispersion compensator be installed for each 150 km of the optical transmission line.

Next, a plurality of samples of the dispersion compensating optical fiber, dispersion compensator and optical transmission line having the above-mentioned structures were manufactured and evaluated.

First, sample F1 of the dispersion compensating optical fiber constituting the optical fiber according to the present invention has a triple cladding type refractive index profile of the type shown in FIGS. 2A and 2B. In this fiber sample F1, the core diameter 2a is 2.6 µm, the first cladding diameter 2b is 5.2 µm, and the second cladding diameter 2c is 10.8 µm. Furthermore, the relative refractive index difference $\Delta n1$ of the core with respect to the third cladding is 2.8%, the relative refractive index difference of the first cladding $\Delta n2$ is −0.74%, and the relative refractive index difference $\Delta n3$ of the second cladding is 0.32%.

Fiber sample F1 has a chromatic dispersion of −172 ps/nm/km and a dispersion slope of −0.16 ps/nm$^2$/km at a wavelength of 1520 nm, a chromatic dispersion of −176 ps/nm/km and a dispersion slope of −0.08 ps/nm$^2$/km at a wavelength of 1550 nm, and a mode field diameter (MFD) of 4.0 µm. Furthermore, the effective cutoff wavelength in a 2-meter length of this fiber sample F1 is 1.28 µm, the amount of increase in the bending loss at a wavelength of 1550 nm when the bending diameter is 40 mm is 0.01 dB/km or less, and the amount of increase in the bending loss at a wavelength of 1550 nm when the bending diameter is 60 mm is 0.01 dB/km or less.

As shown in FIG. 1, the chromatic dispersion profile of fiber sample F1 has negative chromatic dispersion in the C- and L-band, and has a shape that bulges in the minus direction as seen from the chromatic dispersion value axis.

Like fiber sample F1, sample F2 of the dispersion compensating optical fiber according to the present invention also has a triple cladding type refractive index profile. In this fiber sample F2, the core diameter 2a is 3.2 µm, the first cladding diameter 2b is 7.7 µm, and the second cladding diameter 2c is 15.4 µm. Furthermore, the relative refractive index difference $\Delta n1$ of the core with respect to the third cladding is 2.8%, the relative refractive index difference $\Delta n2$ of the first cladding is −0.74%, and the relative refractive index difference $\Delta n3$ of the second cladding is 0.32%.

Fiber sample F2 has a chromatic dispersion of −249 ps/nm/km and a dispersion slope of −0.64 ps/nm$^2$/km at a wavelength of 1520 nm, a chromatic dispersion of −263 ps/nm/km and a dispersion slope of −0.28 ps/nm$^2$/km at a wavelength of 1550 nm, and a mode field diameter (MFD) of 4.2 µm. Furthermore, the effective cutoff wavelength in a 2-meter length of this fiber sample F2 is 1.45 µm, the amount of increase in the bending loss at a wavelength of 1550 nm when the bending diameter is 40 mm is 0.05 dB/km or less, and the amount of increase in the bending loss at a wavelength of 1550 nm when the bending diameter is 60 mm is 0.01 dB/km or less.

Like the chromatic dispersion profile of the dispersion compensating optical fiber C shown in FIG. 1, the chromatic dispersion profile of fiber sample F2 has a negative chromatic dispersion in the C- and L-band, and has a shape that bulges in the minus direction as seen from the chromatic dispersion value axis.

Furthermore, the fiber comparative example F3 described below was used as a conventional dispersion compensating optical fiber, with a chromatic dispersion profile having a shape bulging in the plus direction in the C- and L-band as seen from the chromatic dispersion value axis, for combination with the fiber samples F1 and F2.

As shown in FIGS. 2A and 2B, the fiber comparative example F3 has a triple cladding type refractive index profile. In the comparative example F3, the core diameter 2a is 4.3 µm, the first cladding diameter 2b is 11.0 µm, and the second cladding diameter 2c is 15.4 µm. Furthermore, the relative refractive index difference $\Delta n1$ of the core with respect to the third cladding is 1.6%, the relative refractive index difference $\Delta n2$ of the first cladding is −0.50%, and the relative refractive index difference $\Delta n3$ of the second cladding is 0.30%.

The fiber comparative example F3 has a chromatic dispersion of −61 ps/nm/km and a dispersion slope of −0.25 ps/nm$^2$/km at a wavelength of 1520 nm, a chromatic dispersion of −70 ps/nm/km and a dispersion slope of −0.36 ps/nm$^2$/km at a wavelength of 1550 nm, and a mode field diameter (MFD) of 4.7 µm. Furthermore, the effective cutoff wavelength in a 2-meter length of the fiber comparative example F3 constituting a conventional dispersion compensating optical fiber is 1.40 µm, the amount of increase in the bending loss at a wavelength of 1550 nm when the bending diameter is 40 mm is 0.5 dB/km or less, and the amount of increase in the bending loss at a wavelength of 1550 nm when the bending diameter is 60 mm is 0.02 dB/km or less.

Figure 5:
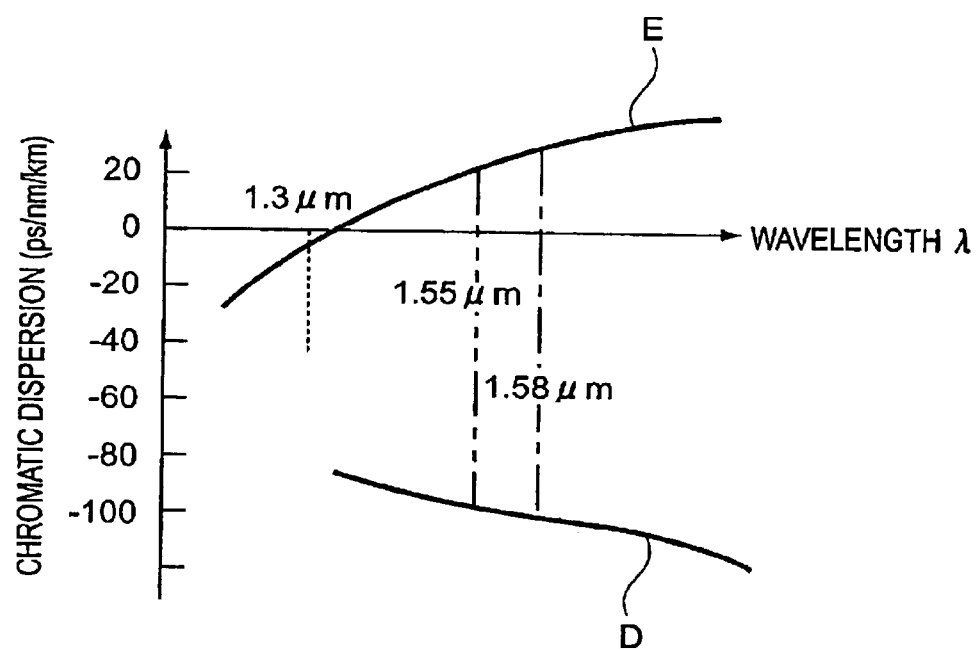
FIG. 5 is a graph showing the chromatic dispersion characteristics of a conventional dispersion compensating optical fiber and transmission optical fiber prepared as comparative example F3 of the optical fiber according to the present invention.

The chromatic dispersion profile of the fiber comparative example F3 is graph D in FIG. 5; graph E in FIG. 5 is the chromatic dispersion profile of the transmission optical fiber. Furthermore, the constructions and characteristics of the samples F1 and F2 of the dispersion compensating optical fiber according to the present invention, and of the comparative example F3 constituting a conventional dispersion compensating optical fiber, are shown in FIG. 6.

Next, the present inventors manufactured samples M1 through M8 of dispersion compensators using the optical fibers having the structures (samples F1 through F3).

(Sample M1)

The dispersion compensator of this sample M1 uses a dispersion compensating optical fiber (sample F1) with a length of 1.7 km, and has a construction in which the fiber sample F1 was wound on a bobbin, and was then placed in a bundled state by removing the bobbin; furthermore, this coil is accommodated inside a housing, and the coil is held by a resin. Furthermore, the outer diameter of the third cladding (hereafter referred to as the "glass diameter") in fiber sample F1 is 80 µm, and the outer diameter including the covering layer (hereafter referred to as the "coating diameter") is 140 µm. The resin is a silicone gel; this silicone gel was hardened by being heated for 2 hours at 70° C., and held the coil of the fiber sample F1.

The outer diameter of the winding trunk portion of the bobbin on which the fiber sample F1 was wound (corresponding to the winding inner diameter of the dispersion compensating optical fiber wound into the form of a coil, hereafter referred to as the "winding trunk diameter") is 40 mm. This sample M1 has a total chromatic dispersion of −300 ps/nm, a total dispersion slope of −0.13 ps/nm$^2$, and an insertion loss of 3.3 dB. Furthermore, the external dimensions of the housing of this sample M1 are 120 mm (long)×120 mm (wide)×18 mm (high).

(Sample M2)

The dispersion compensator of this sample M2 has the same structure as the sample M1, except for the fact that a fiber sample F1 with a glass diameter of 125 µm and a coating diameter of 185 µm was used. This sample M2 has a total chromatic dispersion of −300 ps/nm, a total dispersion slope of −0.13 ps/nm$^2$, and an insertion loss of 3.3 dB. Furthermore, the external dimensions of the housing of this sample M2 are 120 mm (long)×120 mm (wide)×18 mm (high).

(Sample M3)

The dispersion compensator of this sample M3 has the same structure as the sample M1, except for the fact that a fiber sample F1 with a length of 3.4 km was used. This sample M3 has a total chromatic dispersion of −600 ps/nm, a total dispersion slope of −0.26 ps/nm$^2$, and an insertion loss of 4.6 dB. Furthermore, the external dimensions of the housing of this sample M3 are 130 mm (long)×130 mm (wide)×17 mm (high).

(Sample M4)

The dispersion compensator of this sample M4 has the same structure as the sample M1, except for the fact that a fiber sample F2 with a glass diameter of 80 μm, a coating diameter of 185 μm and a length of 0.30 km was used, and the winding trunk diameter of the coil was set at 40 mm. This sample M4 has a total chromatic dispersion of −80 ps/nm, a total dispersion slope of −0.08 ps/nm$^2$, and an insertion loss of 2.1 dB. Furthermore, the external dimensions of the housing of this sample M4 are 100 mm (long)×100 mm (wide)×14 mm (high).

(Sample M5)

The dispersion compensator of this sample M5 has the same structure as the sample M4, except for the fact that a fiber sample F2 with a glass diameter of 125 μm a coating diameter of 185 μm and a length of 1.14 km was used. This sample M5 has a total chromatic dispersion of −300 ps/nm, a total dispersion slope of −0.31 ps/nm$^2$, and an insertion loss of 2.8 dB. Furthermore, the external dimensions of the housing of this sample M5 are 120 mm (long)×120 mm (wide)×18 mm (high).

(Sample M6)

The dispersion compensator of this sample M6 has the same structure as the sample M4, except for the fact that a fiber sample F2 with a length of 2.28 km was used. This sample M6 has a total chromatic dispersion of −600 ps/nm, a total dispersion slope of −0.63 ps/nm$^2$, and an insertion loss of 3.7 dB. Furthermore, the external dimensions of the housing of this sample M6 are 130 mm (long)×130 mm (wide)×17 mm (high).

(Sample M7)

The dispersion compensator of this sample M7 has the same structure as the sample M4, except for the fact that a fiber sample F2 with a length of 4.56 km was used. This sample M7 has a total chromatic dispersion of −1200 ps/nm, a total dispersion slope of −1.26 ps/nm$^2$, and an insertion loss of 5.6 dB. Furthermore, the external dimensions of the housing of this sample M7 are 170 mm (long)×170 mm (wide)×17 mm (high).

(Sample M8)

The dispersion compensator of this sample M8 has a construction in which a fiber sample F2 with a glass diameter of 125 μm, a coating diameter of 185 μm and a length of 2.30 km and a fiber comparative example F3 with a glass diameter of 125 μm, a coating diameter of 185 μm and a length of 10.8 km were connected by fusion, these fiber samples F2 and F3 were accommodated inside a housing after being placed in a fiber bundled state by winding the fibers on bobbins and then removing the bobbins, and the optical fibers were held hardening a resin as in sample M1.

In this case, winding trunk diameter of the fiber sample F2 is 40 mm, the winding trunk diameter of the fiber comparative example F3 is 120 mm, and the outer diameter of the coil of the fiber comparative example F3 is 200 mm. Furthermore, the coil of the fiber sample F2 is disposed inside the coil of the fiber comparative example F3. The external dimensions of the housing of this sample M8 are 220 mm (long)×230 mm (wide)×40 mm (high).

The fiber sample F2 alone, which is a dispersion compensating optical fiber, has a total chromatic dispersion of −600 ps/nm and a total dispersion slope of −0.63 ps/nm$^2$, and the fiber comparative example F3 alone, which is a conventional dispersion compensating optical fiber, has a total chromatic dispersion of −756 ps/nm and a total dispersion slope of −3.88 ps/nm$^2$. Moreover, the sample M8 has a total chromatic dispersion of −1360 ps/nm, a total dispersion slope of −4.5 ps/nm$^2$, and a total wet melt loss of 7 dB.

Figure 8:
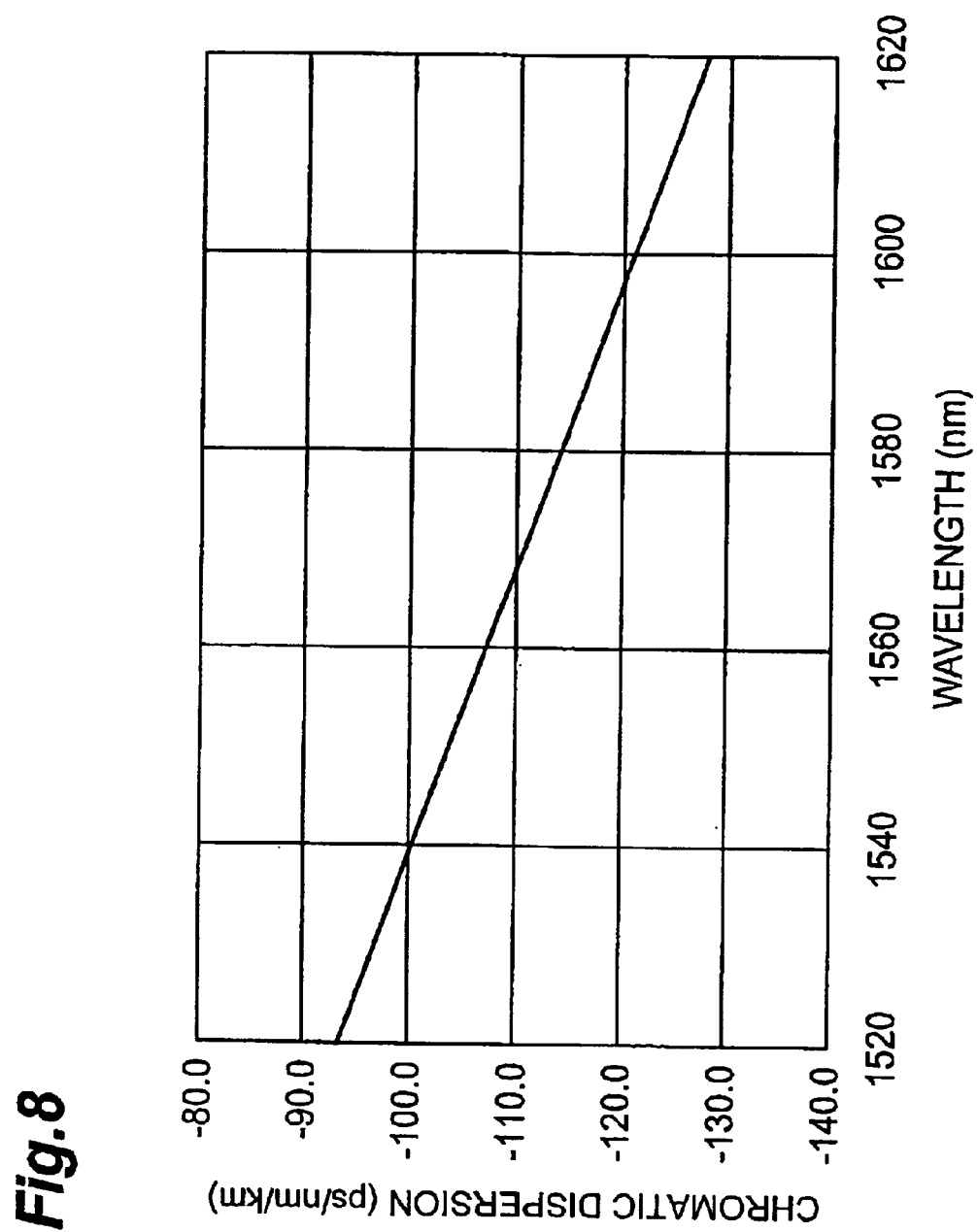
FIG. 8 is a graph showing the chromatic dispersion characteristics of sample M8 of the dispersion compensator according to the present invention.
Figure 9:
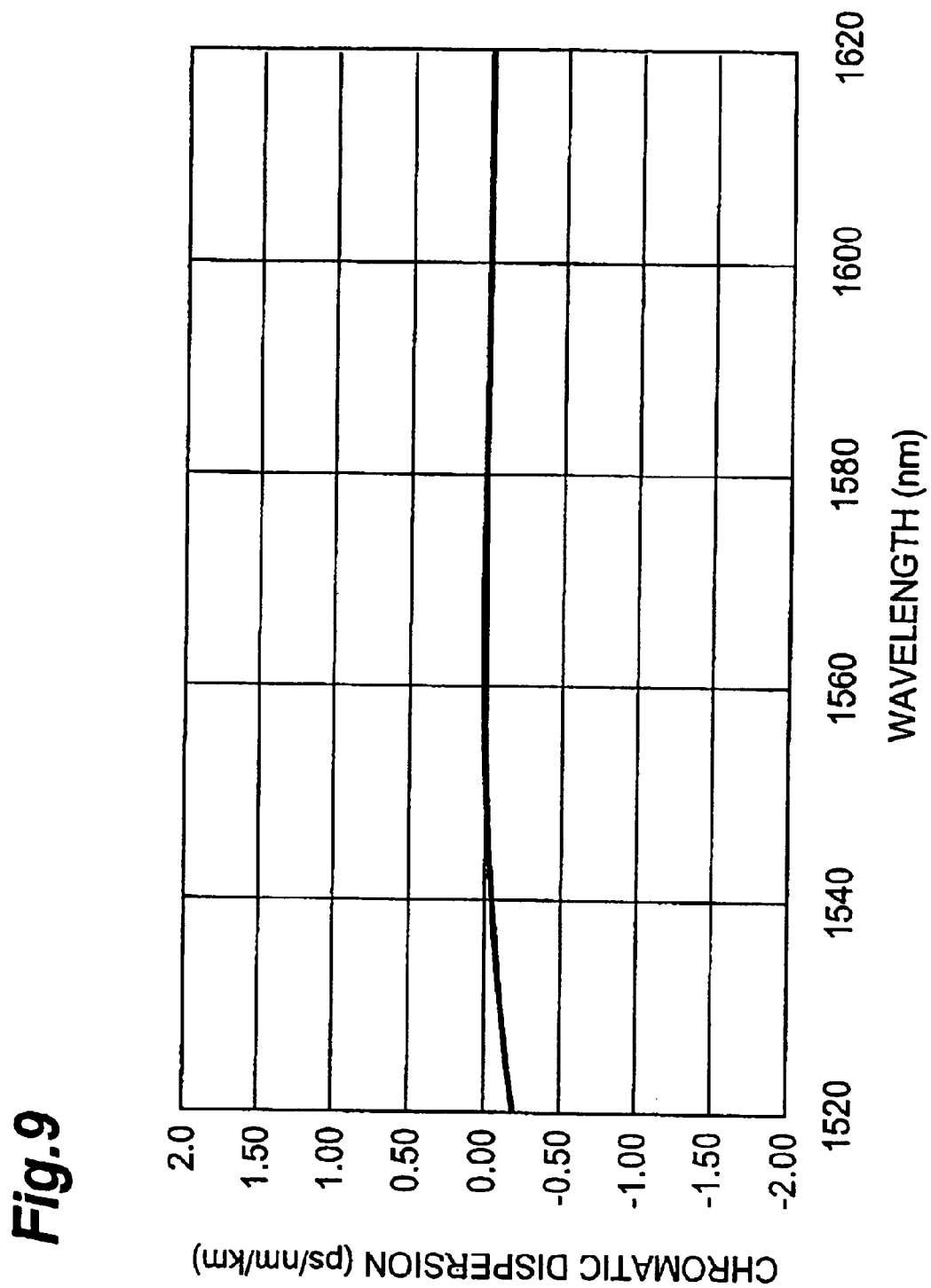
FIG. 9 is a graph showing the chromatic dispersion characteristics of the optical transmission line as a whole in a case where sample M8 of the dispersion compensator according to the present invention is connected to the transmission optical fiber.

FIG. 7 is a table showing the constructions and characteristics of the dispersion compensators of these samples M1 through M8. Furthermore, FIG. 8 is a graph showing the chromatic dispersion characteristics of the dispersion compensator of sample M8, and FIG. 9 is a graph showing the chromatic dispersion characteristics according to the optical transmission line as a whole in a case where the dispersion compensator of sample M8 is connected to a transmission single-mode fiber with a length of 100 km. It is seen from these FIGS. 8 and 9 that appropriate compensation is made for the chromatic dispersion of the transmission optical fiber in the C- and L-band. Furthermore, the chromatic dispersion characteristics of this transmission single-mode fiber correspond to the profile indicated by E in FIG. 5.

In the present invention, as described above, favorable compensation can be made for the chromatic dispersion of the optical transmission line as a whole by utilizing a dispersion compensator employing a dispersion compensating optical fiber which has a negative chromatic dispersion in the C-band, L-band, expanded L-band or C- and L-band, and which has a chromatic dispersion profile with a shape that bulges in the minus direction as seen from the chromatic dispersion value axis. Furthermore, a compact dispersion compensator and optical transmission line can be obtained.

Furthermore, the present invention is not limited to the above-mentioned embodiments, and may adopt various modified aspects.

In the following description, more concrete structures of the dispersion compensator, optical transmission line and optical communications system according to the present invention will be described in detail. Furthermore, in the following description, the C-band (1530 to 1565 nm) will be used as an example of the signal wavelength band; however, the present invention is not limited to the C-band.

Figure 10:
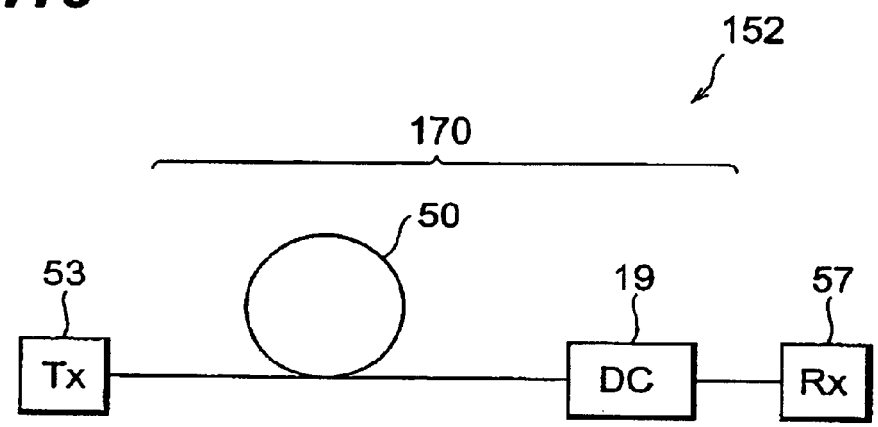
FIG. 10 is a diagram showing the construction of one embodiment of the optical communications system according to the present invention.

FIG. 10 is a diagram showing the construction of the optical communications system according to the present invention. The optical communications system 152 shown in FIG. 10 comprises an optical transmission line 2 including a dispersion compensator (DC) 10 and a transmission optical fiber 20, a transmitter (TX) 30, and a receiver (RX) 40. The transmission optical fiber 20 is laid between the transmitter 30 and the receiver 40. The dispersion compensator 10 may be laid between the transmitter 30 and the receiver 40, or may be formed into a module and installed in a certain position on the optical transmission line 2. In this optical communications system 1, signal light in which a plurality of channels are multiplexed, which is output from the transmitter 30, is propagated through the optical transmission line 2 and thus reaches the receiver 40; the signal light is received for the respective signal channels in this receiver 40.

The optical transmission line 2 located on the signal transmission path extending from the transmitter 30 to the receiver 40 includes a transmission optical fiber 20, and a dispersion compensator 10 located in the after-stage of this transmission optical fiber. For example, the transmission optical fiber 20 is a single-mode optical fiber as defined by the international standard ITU-T G.652, a dispersion shifted optical fiber as defined by ITU-T G.653, or a non-zero dispersion shifted optical fiber as defined by ITU-T G.655. The dispersion compensator 10 is an optical device that compensates for the chromatic dispersion of the transmission optical fiber 20, and has a structure in which N optical fibers are cascade-connected. Here, N is an integer of 2 or more.

Figure 11:
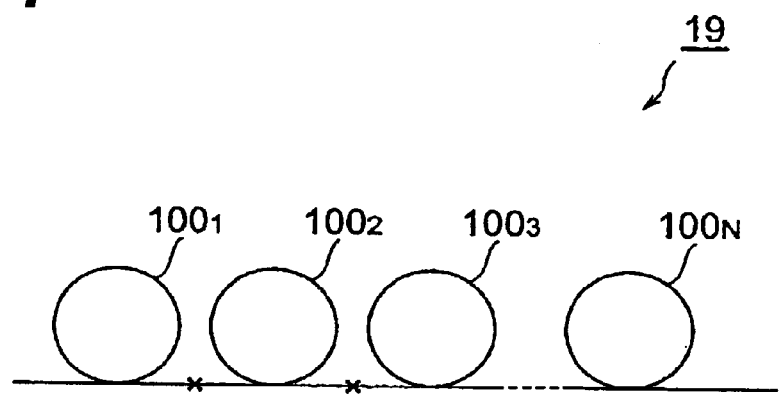
FIG. 11 is a diagram showing the schematic construction of the dispersion compensator (the dispersion compensator according to the present invention) used in the optical communications system shown in FIG. 10.

FIG. 12 is a diagram showing the structure of the dispersion compensator 10 (i.e., the dispersion compensator according to the present invention) shown in FIG. 11. This dispersion compensator 10 has a structure in which N optical fibers $11_1$ through $11_N$ are cascade-connected. Here, the length of the nth optical fiber $11_n$ is designated as $L_n$ (km), the chromatic dispersion of the nth optical fiber $11_n$ is designated as $D_n$ (ps/nm/km), the dispersion slope of the nth optical fiber $11_n$ is designated as $S_n$ (ps/nm$^2$/km), and the dispersion curvature of the nth optical fiber $11_n$ is designated as $C_n$ (ps/nm$^3$/km). Here, n is an integer from 1 to N. In this case, the relationship expressed by the following equation (2) is established among the chromatic dispersion $D_n$, dispersion slope $S_n$, dispersion curvature $C_n$ and wavelength λ (nm) of each optical fiber $11_n$.

$$C_n = \frac{dS_n}{d\lambda} = \frac{d^2 D_n}{d\lambda^2} \quad (2)$$

In general, the RDS (relative dispersion slope) of an optical fiber is defined as the ratio of the dispersion slope S to the chromatic dispersion D (S/D), and is used as an indicator that expresses the compensation rate of the dispersion slope. Furthermore, the RDC (relative dispersion curvature) (1/nm$^2$) of an optical fiber is defined as the ratio of the dispersion curvature C to the chromatic dispersion D (C/D), and is used as an indicator that expresses the compensation rate of the dispersion curvature.

The dispersion curvature C of common optical fibers installed as transmission optical fibers is extremely small in the signal light wavelength band. On the other hand, the absolute value of the dispersion curvature C of conventional dispersion compensating optical fibers themselves is a large negative value. For this reason, in the case of conventional dispersion compensators, even if both the chromatic dispersion and the dispersion slope of the transmission optical fiber can be completely compensated for at certain wavelengths in the signal wavelength band, this compensation is insufficient at other wavelengths (e.g., the wavelengths at both ends of the signal wavelength band).

Accordingly, the dispersion compensator 10 according to the present invention has a construction in which N optical fibers are cascade-connected, and the absolute value of the RDC of the dispersion compensator 10 as a whole, as expressed by the following equation (3), is 10$^{-4}$/nm$^2$ or less. Preferably, furthermore, the absolute value of the RDC of the dispersion compensator 10 as a whole is 10$^{-5}$/nm$^2$ or less.

$$RDC = \frac{\sum_{n=1}^{N} C_n L_n}{\sum_{n=1}^{N} D_n L_n} \quad (3)$$

It is desirable that the dispersion curvature of at least one of the optical fibers among the N optical fibers $11_1$ through $11_N$ be positive, and that the dispersion curvature of at least one of the remaining optical fibers be negative. As a result of such a construction, the absolute value of the RDC of the dispersion compensator 10 as a whole can be reduced to 10$^{-4}$/nm$^2$ or less (or 10$^{-5}$/nm$^2$ or less).

Furthermore, the RDS of this dispersion compensator 10 as a whole is expressed by the following equation (4).

$$RDS = \frac{\sum_{n=1}^{N} S_n L_n}{\sum_{n=1}^{N} D_n L_n} \quad (4)$$

In order to allow the dispersion compensator 10 to compensate for both the chromatic dispersion and the dispersion slope of the transmission optical fiber 20, it is desirable that the RDS of the dispersion compensator 10 be substantially equal to the RDS of the transmission optical fiber 20. Furthermore, in order to allow the dispersion compensator 10 to compensate for the dispersion curvature of the transmission optical fiber 20 as well, it is desirable that the RDC of the dispersion compensator 10 be substantially equal to the RDC of the transmission optical fiber 20. Accordingly, in correspondence to the fact that the absolute value of the dispersion curvature C of common optical fibers installed as transmission optical fibers is extremely small in the signal wavelength band, it is desirable that the absolute value of the RDC of the dispersion compensator 10 according to the present invention also be small.

Next, in a first aspect of the dispersion compensator 10 according to the present invention, it is desirable that this dispersion compensator overall have an RDS of 0.0032/nm to 0.0038/nm. In this case, if a single-mode optical fiber defined by ITU-T G.652 is used as the transmission optical fiber 20, the dispersion compensator 10 of this first aspect can sufficiently compensate for the chromatic dispersion of this transmission optical fiber 120 over a broad signal light wavelength band. Specifically, the first embodiment of the optical transmission line according to the present invention comprises a transmission optical fiber which transmits signal light of a plurality of channels of different wavelengths, and the dispersion compensator of the first aspect, which compensates for the chromatic dispersion of this transmission optical fiber. In this case, it is desirable that the difference between the respective RDS values of the transmission optical fiber and the dispersion compensator be 0.0003/nm or less. Furthermore, in this first aspect of the dispersion compensator according to present invention, it is desirable that the absolute value of the total chromatic dispersion throughout the used wavelength region be 0.01 ps/nm/km or less.

In a second aspect of the dispersion compensator 10 according to the present invention, it is desirable that the dispersion compensator overall have an RDS of 0.0068/nm to 0.0082/nm. In this case, if a PureGuide (registered trademark), among non-zero dispersion shifted optical fibers defined by ITU-T G.655, is used as the transmission optical fiber 20, this dispersion compensator 10 can sufficiently compensate for the chromatic dispersion of this transmission optical fiber 20 over a broad signal light wavelength band. Specifically, the second embodiment of the optical transmission line according to the present invention comprises a transmission optical fiber which transmits signal light of a plurality of channels of different wavelengths, and the dispersion compensator of the second aspect, which compensates for the chromatic dispersion of this transmission optical fiber. In this case, it is desirable that the difference between the respective RDS values of the transmission optical fiber and dispersion compensator be 0.0007/nm or less. Furthermore, it is desirable that the absolute value of the total chromatic dispersion throughout the used wavelength region be 0.05 ps/nm/km or less.

In a third aspect of the dispersion compensator 10 according to the present invention, it is desirable that the dispersion compensator overall have an RDS of 0.009/nm to 0.011/nm. In this case, if a TrueWave-RS (registered trademark), among non-zero dispersion shifted optical fibers defined by ITU-T G.655, is used as the transmission optical fiber 20, this dispersion compensator 10 can sufficiently compensate for the chromatic dispersion of this transmission optical fiber 20 over a broad signal light wavelength band. Specifically, the third embodiment of the optical transmission line according to the present invention comprises a transmission optical fiber for transmitting signal light of a plurality of channels of different wavelengths, and the dispersion compensator of the third aspect, which compensates for the chromatic dispersion of this transmission optical fiber. In this case, it is desirable that the difference between the respective RDS values of the transmission optical fiber and dispersion compensator be 0.001/nm or less. Furthermore, it is desirable that the absolute value of the total chromatic dispersion throughout the used wavelength region be 0.02 ps/nm/km or less.

Furthermore, it is desirable that the insertion loss $\alpha$ (dB) of the dispersion compensator 10 satisfy the following equations (5a) and (5b).

$$\alpha \leq -0.005 \times (\text{total chromatic dispersion}) + 1.1 \tag{5a}$$

$$\text{total chromatic dispersion} = \sum_{n=1}^{N} D_n L_n \tag{5b}$$

Furthermore, a fourth embodiment of the optical transmission line according to the present invention may comprise a transmission optical fiber which has an RDS of 0.0032/nm to 0.0038/nm at a predetermined wavelength in a used wavelength region with a bandwidth of 30 nm or more included in the wavelength band of 1535 nm to 1610 nm, and a dispersion compensator which compensates for the chromatic dispersion of this transmission optical fiber. In this case, it is desirable that the difference between the respective RDS values of the transmission optical fiber and the dispersion compensator at the predetermined wavelength be 0.0003/nm or less; moreover, it is desirable that the absolute value of the total chromatic dispersion in the used wavelength region be 0.01 ps/nm/km or less. Further, the used wavelength region may appropriately include the wavelength band of 1535 to 1565 nm, and a single-mode optical fiber as defined in ITU-T G.652 may be cited as an example of a transmission optical fiber 20 having the above-mentioned characteristics.

A fifth embodiment of the optical transmission line according to the present invention may comprise a transmission optical fiber which has an RDS of 0.0068/nm to 0.0082/nm at a predetermined wavelength in a used wavelength region with a bandwidth of 30 nm or more included in the wavelength band of 1535 nm to 1610 nm, and a dispersion compensator which compensates for the chromatic dispersion of this transmission optical fiber. In this case, it is desirable that the difference between the respective RDS values of the transmission optical fiber and the dispersion compensator at the predetermined wavelength be 0.0007/nm or less; moreover, it is desirable that the absolute value of the total chromatic dispersion in the used wavelength region be 0.05 ps/nm/km or less. Furthermore, the used wavelength region may appropriately include the wavelength band of 1535 to 1565 nm, and a PureGuide (registered trademark), among the non-zero dispersion shifted optical fibers defined in defined in ITU-T G.655, may be cited as an example of a transmission optical fiber 20 having the above-mentioned characteristics.

A sixth embodiment of the optical transmission line according to the present invention may comprise a transmission optical fiber which has an RDS of 0.009/nm to 0.011/nm at a predetermined wavelength in a used wavelength region with a bandwidth of 30 nm or more included in the wavelength band of 1535 nm to 1610 nm, and a dispersion compensator which compensates for the chromatic dispersion of this transmission optical fiber. In this case, it is desirable that the difference between the respective RDS values of the transmission optical fiber and the dispersion compensator at the predetermined wavelength be 0.001/nm or less; moreover, it is desirable that the absolute value of the total chromatic dispersion in the used wavelength region be 0.019 ps/nm/km or less.

Furthermore, the used wavelength region may appropriately include the wavelength band of 1535 to 1565 nm, and a TrueWave-RS (registered trademark), is among the non-zero dispersion shifted optical fibers defined in defined in ITU-T G.655, may be cited as an example of a transmission optical fiber 20 having the above-mentioned characteristics.

In the following description, a case will be described in which N is 2, i.e., in which the dispersion compensator 10 is constructed from two optical fibers $11_1$ and $11_2$.

$RDS_1$ and $RDC_1$ of the first optical fiber $11_1$ are expressed by the following equations (6a) and (6b). Furthermore, $RDS_2$ and $RDC_2$ of the second optical fiber $11_2$ are expressed by the following equations (7a) and (7b)

$$RDS_1 = \frac{S_1}{D_1} \tag{6a}$$

$$RDC_1 = \frac{C_1}{D_1} \tag{6b}$$

$$RDS_2 = \frac{S_2}{D_2} \tag{7a}$$

$$RDC_2 = \frac{C_2}{D_2} \tag{7b}$$

$RDS_0$ and $RDC_0$ of the dispersion compensator 10 are expressed by the following equations (8a) and (8b). Also, $RDC_0$ of the dispersion compensator 10 is expressed by the following equation (9) using $RDS_1$ and $RDC_1$ of the first optical fiber $11_1$, $RDS_2$ and $RDC_2$ of the second optical fiber $11_2$, and the $RDS_0$ value of the dispersion compensator 10.

$$RDS_0 = \frac{S_1 L_1 + S_2 L_2}{D_1 L_1 + D_2 L_2} \tag{8a}$$

$$RDC_0 = \frac{C_1 L_1 + C_2 L_2}{D_1 L_1 + D_2 L_2} \tag{8b}$$

$$RDC_0 = \frac{RDC_1(RDS_0 - RDC_2) - RDC_2(RDS_0 - RDS_1)}{RDS_1 - RDS_2} \tag{9}$$

Next, the optical transmission line 2 and dispersion compensator 10 according to the present invention will be described. In the following samples of respective dispersion compensators 10, the dispersion compensator is constructed from two optical fibers.

FIG. 12 is a table showing respective specifications of fiber samples F4 through F14 which can constitute the dispersion compensator according to the present invention, and fiber samples F15 through F17 which can be used as transmission optical fibers.

Each of the fiber samples F4 through F8 and F10 through F14 is an optical fiber 100 which has a triple cladding type refractive index profile 130 of the type shown in FIGS. 2A and 2B. The optical fibers 100 corresponding to these fiber samples F4 through F8 and F10 through F14 each having a core 111 (maximum refractive index n1, outer diameter 2a), a first cladding 112 (refractive index n2, outer diameter 2b), a second cladding 113 (refractive index n3, outer diameter 2c) and an outermost layer of cladding 114 (refractive index n4) in that order from the center. Furthermore, the outermost layer of cladding corresponds to the third cladding.

Figure 13A:
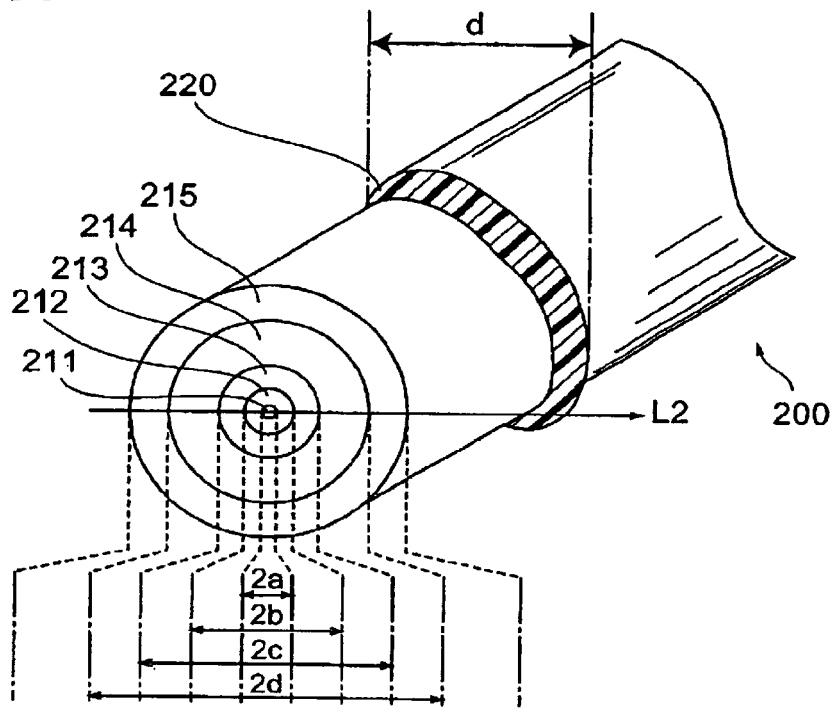
Figure 13B:
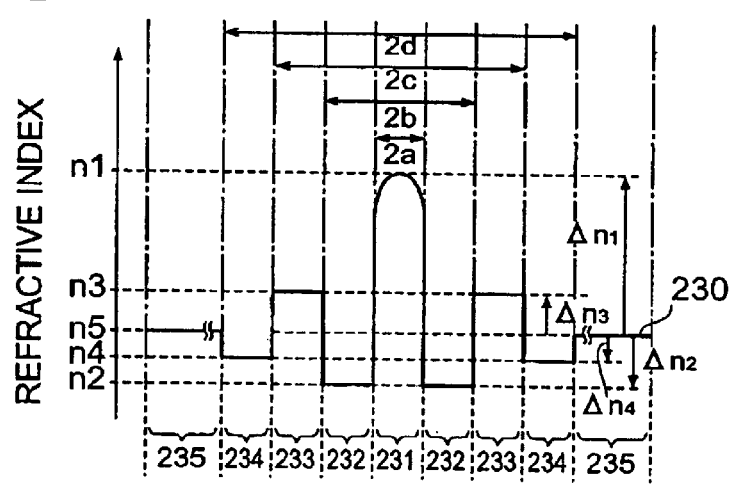
FIG. 13B is the refractive index profile of the same.

The fiber sample F9 is an optical fiber 200 which has a quadruple cladding type refractive index profile 230 of the type shown in FIGS. 13A and 13B. The optical fiber 200 corresponding to this fiber sample F8 has a core 211 (maximum refractive index n1, outer diameter 2a), a first cladding 212 (refractive index n2, outer diameter 2b), a second cladding 213 (refractive index n3, outer diameter 2c), a third cladding 214 (refractive index n4, outer diameter 2d) and an outermost layer of cladding 215 (refractive index n5).

In the refractive index profile 230 shown in FIG. 13B, the relative refractive index difference of the core with reference to the refractive index of the outermost layer of cladding 215 is $\Delta n1$ $(=(n1-n5)/n5)$, the relative refractive index difference of the first cladding is $\Delta n2$ $(=(n2-n5)/n5)$, the relative refractive index difference of the second cladding is $\Delta n3$ $(=(n3-n5)/n5)$, and the relative refractive index difference of the third cladding is $\Delta n4$ $(=(n4-n5)/n5)$.

The refractive index profile 230 shown in FIG. 13B shows the refractive index in respective parts along the line L2 in FIG. 13A. In this refractive index profile 230, the region 231 shows the refractive index of parts of the core 211 located on the line L2, the region 232 shows the refractive index of parts of the first cladding 212 located on the line L2, the region 233 shows the refractive index of parts of the second cladding 213 located on the line L2, the region 234 shows the refractive index of parts of the third cladding 214 located on the line L2, and the region 235 shows the refractive index of parts of the outermost layer of cladding (fourth cladding) 215 located on the line L2.

FIG. 12 shows the relative refractive index difference $\Delta n1$ of the core, the relative refractive index difference $\Delta n2$ of the first cladding, the relative refractive index difference $\Delta n3$ of the second cladding, the relative refractive index difference $\Delta n4$ of the third cladding, the outer diameter 2a of the core, the outer diameter 2b of the first cladding, the outer diameter 2c of the second cladding, the outer diameter 2d of the third cladding, the chromatic dispersion D at a wavelength of 1550 nm, the dispersion slope S, the dispersion curvature C, the RDS, the RDC, the effective cutoff wavelength, and the bending loss for respective bending diameters of 40 mm and 60 mm at a wavelength of 1550 nm, for the respective fiber samples F4 through F14.

As shown in FIG. 12, the respective dispersion curvature values C of fiber samples F4 through F6 and F10 through F12 are positive, and the respective dispersion curvature values C of fiber samples F7 through F9, F13 and F14 are negative. The fiber sample F15 of the transmission optical fiber corresponds to a single-mode optical fiber as defined in ITU-T G.652. The fiber sample F15 corresponds to a PureGuide (registered trademark) among the non-zero dispersion shifted optical fibers defined in ITU-T G.655). Furthermore, the fiber sample F16 corresponds to a TrueWave-RS (registered trademark) among the non-zero dispersion shifted optical fibers defined in ITU-T G.655.

FIG. 14 is a table summarizing the respective specifications of samples M9 through M12 manufactured as individual dispersion compensators according to the present invention. FIG. 14 shows the type of optical fiber used in the construction (sample shown in FIG. 12), length of the optical fiber, glass diameter, coating diameter, total chromatic dispersion of the dispersion compensator as a whole at a wavelength of 1550 nm, total dispersion slope, total dispersion curvature, RDS, RDC, insertion loss, polarization mode dispersion (PMD), non-linear phases shift, form of accommodation of the respective optical fibers and coil diameter for the respective samples M9 through M12 of these dispersion compensators.

The non-linear phase shift is expressed by the following equations (10a) and (10b). Here, $\lambda$ is the wavelength (nm), N2 is the non-linear refractive index (m²/W), $A_{\it eff}$ is the effective area (μm²), L is the fiber length (km), $\alpha$ is the transmission loss (dB/km), and $P_0$ is the input light power (W). The input light power $P_0$ is determined so that the output light power of the dispersion compensator is −28 dBm.

$$\phi = \frac{2\pi}{\lambda} \frac{N_2}{A_{\it eff}} L_{\it eff}\, P_0 \tag{10a}$$

$$L_{\it eff} = \frac{1 - \exp(-\alpha L)}{\alpha} \tag{10b}$$

In each of the samples M9 through M12 of the dispersion compensator according to the present invention, the respective constituent fiber samples are wound into the form of a coil and held by a resin, and these coils are accommodated inside a housing with a size of 220 mm (long)×230 mm (wide)×40 mm (high).

As shown in FIG. 14, the absolute values of the respective RDC values of samples M9 through M11 at a wavelength of 1550 nm are $10^{-5}/nm^2$ or less, and the absolute value of the RDC value of sample M12 is $10^{-4}/nm^2$ or less.

Figure 15:
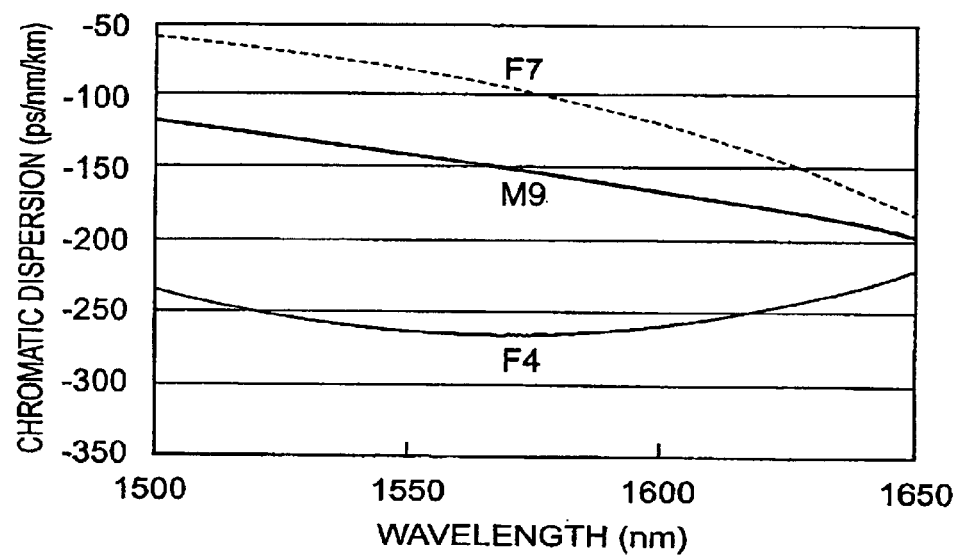
FIG. 15 is a graph showing the respective chromatic dispersion characteristics of the dispersion compensator of sample M9, and two optical fibers F4 and F7 that constitute this dispersion compensator.
Figure 16:
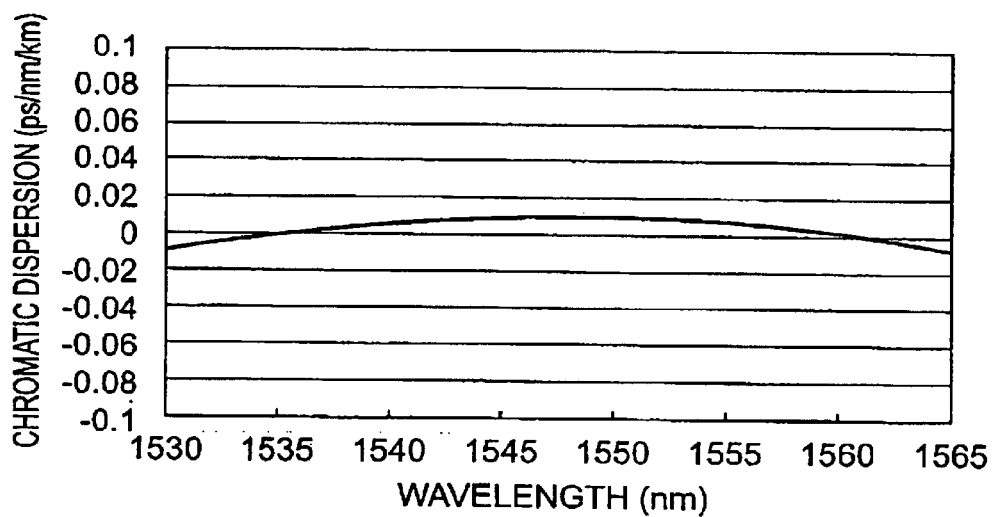
FIG. 16 is a graph showing the overall chromatic dispersion characteristics of an optical transmission line including the dispersion compensator of sample M9 and the transmission optical fiber F15 with a length of 100 km.

FIG. 15 is a graph showing the chromatic dispersion characteristics of sample M9 of the dispersion compensator according to the present invention, and the respective chromatic dispersion characteristics of the two fibers samples F4 and F7 that make up this dispersion compensator. FIG. 16 is a graph showing the chromatic dispersion characteristics of the optical transmission line as a whole (i.e., the optical transmission line according to the present invention) including sample M9 of the dispersion compensator according to the present invention and fiber sample F15 which is a transmission optical fiber with a length of 100 km. At a wavelength of 1550 nm, the RDS of sample M9 is 0.0035/nm, and the RDS of fiber sample F15 is 0.0035/nm, so that the difference between these RDS values is substantially zero.

Figure 17:
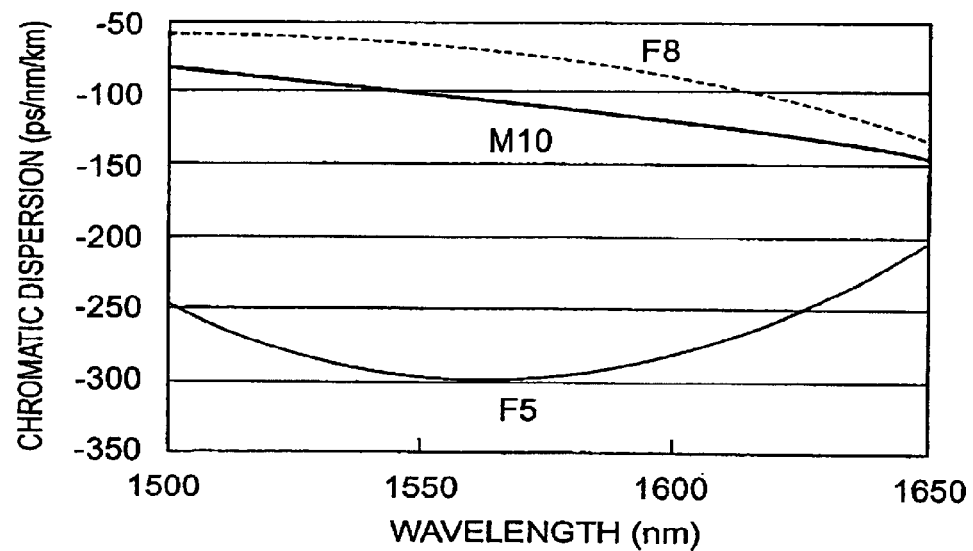
FIG. 17 is a diagram showing the respective chromatic dispersion characteristics of the dispersion compensator of sample M10, and two optical fibers F5 and F8 that constitute this dispersion compensator.
Figure 18:
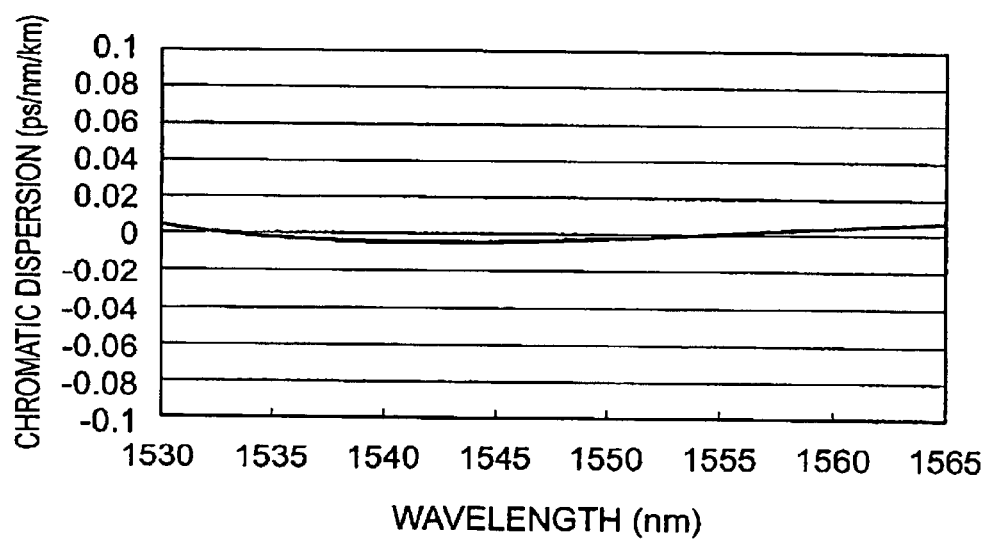
FIG. 18 is a graph showing the overall chromatic dispersion characteristics of an optical transmission line including the dispersion compensator of sample M10 and the transmission optical fiber F15 with a length of 80 km.

FIG. 17 is a graph showing the chromatic dispersion characteristics of sample M10 of the dispersion compensator according to the present invention, and the respective chromatic dispersion characteristics of the two fiber samples F5 and F8 that make up this dispersion compensator. FIG. 17 is a graph showing the overall chromatic dispersion characteristics of an optical transmission line including sample M10 of the dispersion compensator according to the present invention and fiber sample F15 which is a transmission optical fiber with a length of 80 km. At a wavelength of 1550 nm, the RDS of sample M10 is 0.0035/nm, and the RDS of fiber sample F15 is 0.0035/nm, so that the difference between these RDS values is substantially zero.

Figure 19:
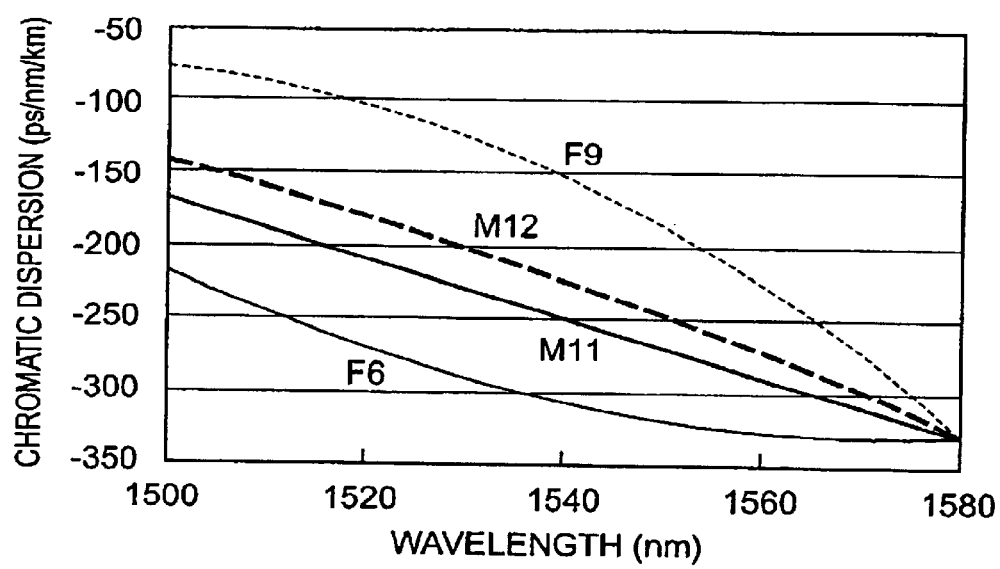
FIG. 19 is a graph showing the respective chromatic dispersion characteristics of the dispersion compensators of samples M11 and M12, and two optical fibers F6 and F9 that constitute these dispersion compensators.
Figure 20:
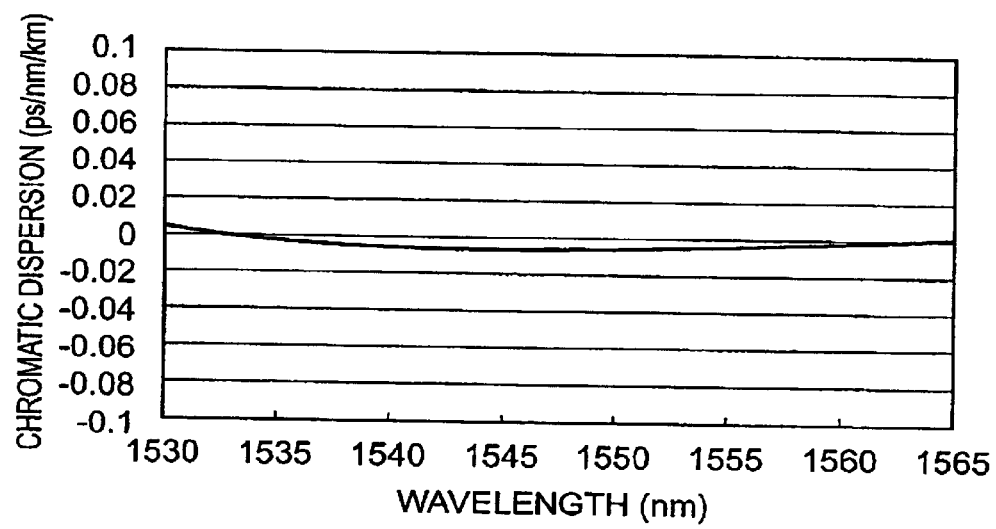
FIG. 20 is a graph showing the overall chromatic dispersion characteristics of an optical transmission line including the dispersion compensator of sample M11 and the transmission optical fiber F16 with a length of 100 km.
Figure 21:
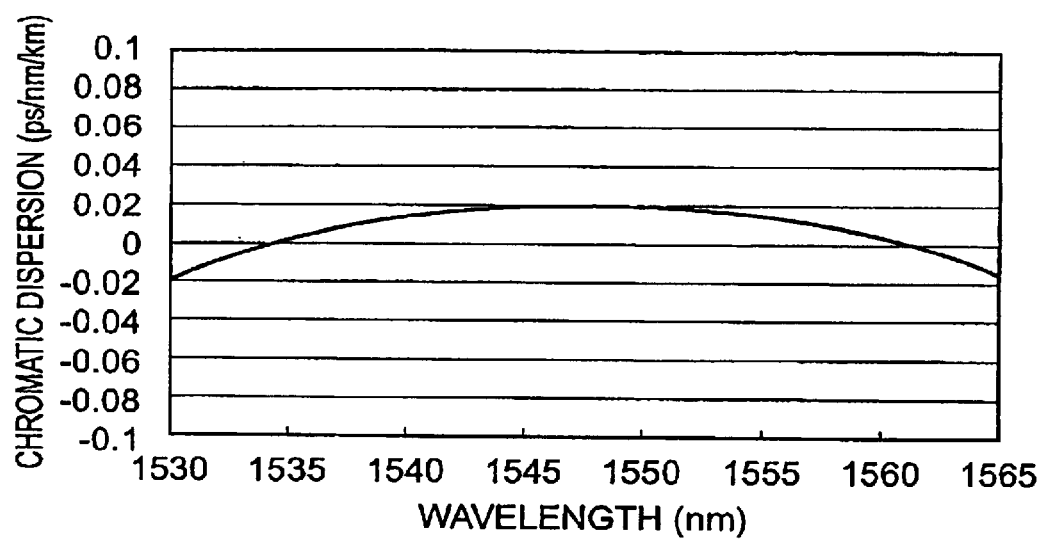
FIG. 21 is a graph showing the overall chromatic dispersion characteristics of an optical transmission line including the dispersion compensator of sample M12 and the transmission optical fiber F17 with a length of 100 km.

FIG. 19 is a graph showing the chromatic dispersion characteristics of samples M11 and M12 of the dispersion compensator according to the present invention, and the respective chromatic dispersion characteristics of the two fiber samples F6 and F9 that make up this dispersion compensator. FIG. 20 is a graph showing the overall chromatic dispersion characteristics of an optical transmission line including sample M11 of the dispersion compensator according to the present invention and fiber sample F16 which is a transmission optical fiber with a length of 100 km. FIG. 21 is a graph showing the overall chromatic dispersion characteristics of an optical transmission line including sample M12 of the dispersion compensator according to the present invention and fiber sample F17 which is a transmission optical fiber with a length of 100 km. At a wavelength of 1550 nm, the RDS of sample M11 is 0.0075/nm, and the RDS of fiber sample F16 is 0.0075/nm, so that the difference between these RDS values is substantially zero. Furthermore, at a wavelength of 1550 nm, the RDS of sample M12 is 0.0100/nm, and the RDS of sample F17 is 0.0098/nm, so that the difference between these RDS values is 0.0002/nm.

As can be seen from FIGS. 15, 17 and 19, the chromatic dispersion in samples M9 through M12 of the dispersion compensator according to the present invention has an almost linear relationship with respect to wavelength in the C-band, so that the absolute value of the dispersion curvature is extremely small. Furthermore, as is seen from FIGS. 16, 18, 20 and 21, the optical transmission line according to the present invention shows an extremely small absolute value of chromatic dispersion in the C-band, i.e., 0.02 ps/nm/km or less.

In particular, in the optical transmission line shown in FIG. 16, the absolute value of the chromatic dispersion in the C-band is 0.009 ps/nm/km or less. In the optical transmission line shown in FIG. 18, the absolute value of the chromatic dispersion in the C-band is 0.006 ps/nm/km or less. Furthermore, in the optical transmission line shown in FIG. 20, the absolute value of the chromatic dispersion in the C-band is 0.005 ps/nm/km or less.

FIG. 22 is a table summarizing the specifications of optical transmission lines and samples M9 through M18 other than the samples M8 through M12 among the samples of the dispersion compensator according to the present invention. FIG. 22 shows the respective types of the first optical fiber and second optical fiber constituting the dispersion compensator, the RDS and RDC values of these optical fibers, the RDS and RDC values of the dispersion compensator, and the type and residual dispersion of the transmission optical fiber. The residual dispersion of optical transmission lines is a maximum value of the absolute value of the chromatic dispersion in the C-band. Furthermore, FIG. 22 also shows values already shown in FIGS. 14 through 21.

As shown in FIG. 22, in the dispersion compensators of samples M9 through M18, the absolute value of the RDC at a wavelength of 1550 nm is $10^{-4}/nm^2$ or less. In particular, in each of samples M9 through M11, M13 and M14, the absolute value of the RDC at a wavelength of 1550 nm is $10^{-5}/nm^2$ or less. Among these dispersion compensators, the absolute value of the RDC at a wavelength of 1550 nm is $10^{-6}/nm^2$ or less in the case of sample M14, which is constructed from fiber samples F10 and F13.

In the optical transmission lines, the absolute value of the chromatic dispersion in the C-band is 0.05 ps/nm/km or less. In particular, in the optical transmission line comprising sample M9 and fiber sample F15, the optical transmission line comprising sample M10 and fiber sample F15, the optical transmission line comprising sample M11 and fiber sample F15, the optical transmission line comprising sample M13 and fiber sample F15, and the optical transmission line comprising sample M14 and fiber sample F16, the absolute value of the chromatic dispersion in the C-band is extremely small, i.e., 0.01 ps/nm/km or less.

Figure 23:
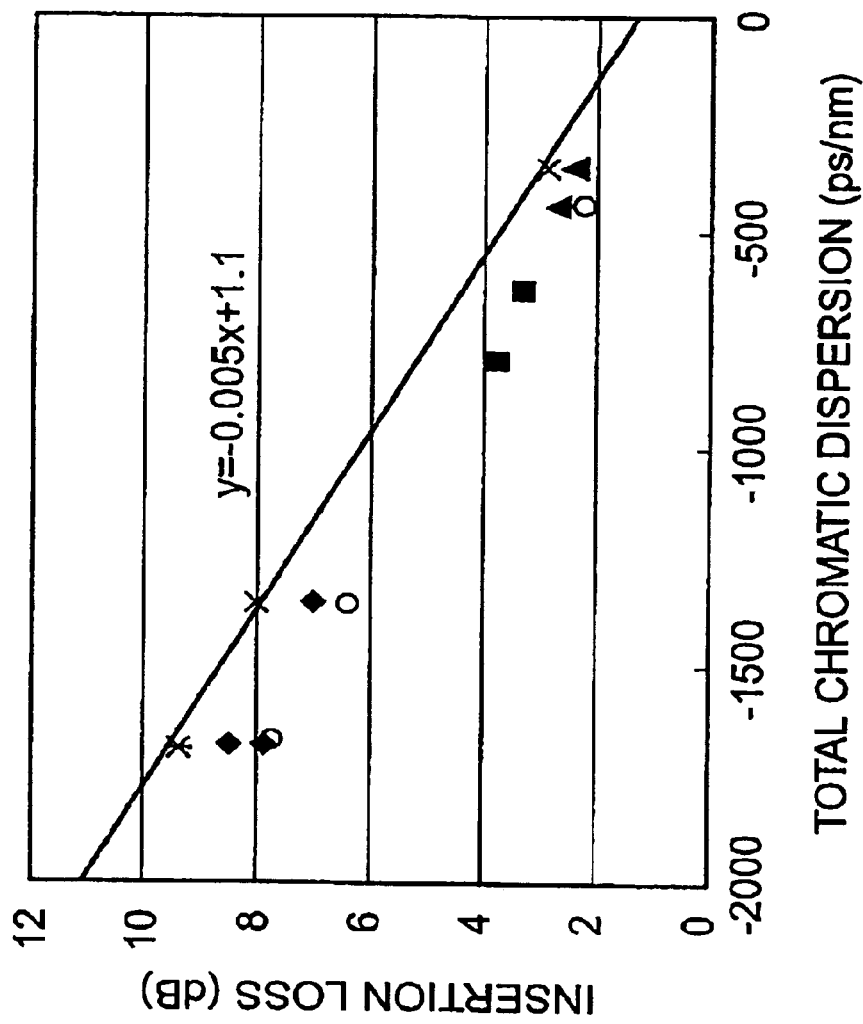
FIG. 23 is a graph showing the relationship between insertion loss and total chromatic dispersion for samples A through C and comparative examples a through c of the dispersion compensator according to the present invention.
Figure 24:
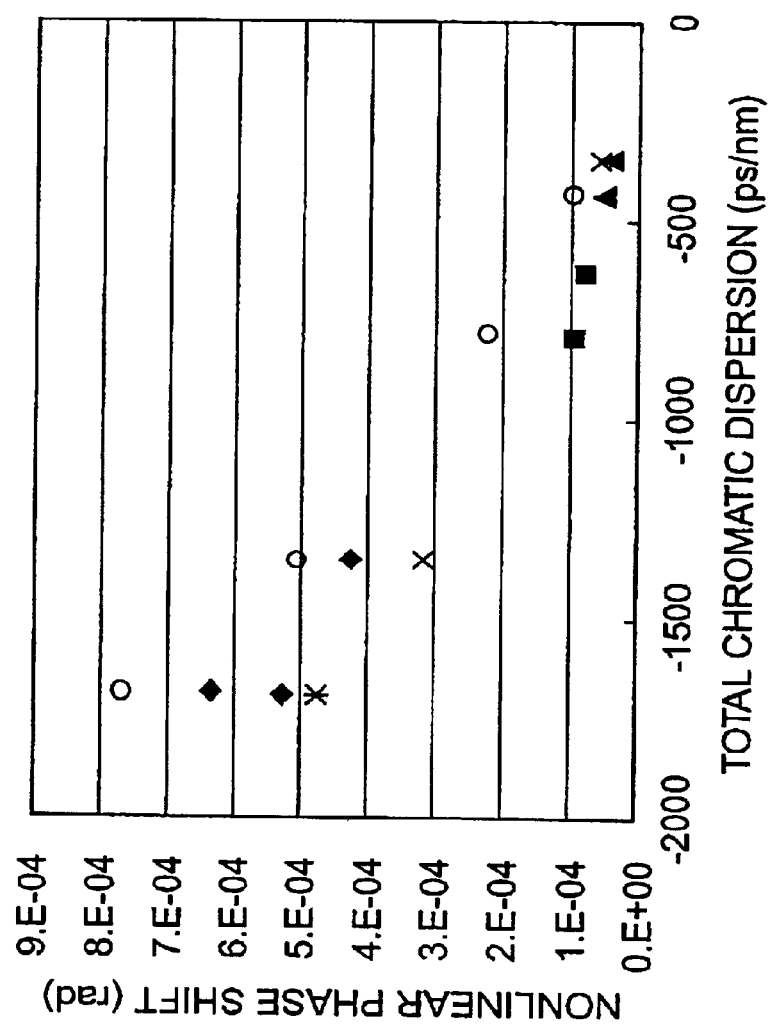
FIG. 24 is a graph showing the relationship between non-linear phase shift amount and total chromatic dispersion for samples A through C and comparative examples a through c of the dispersion compensator according to the present invention.
Figure 25:
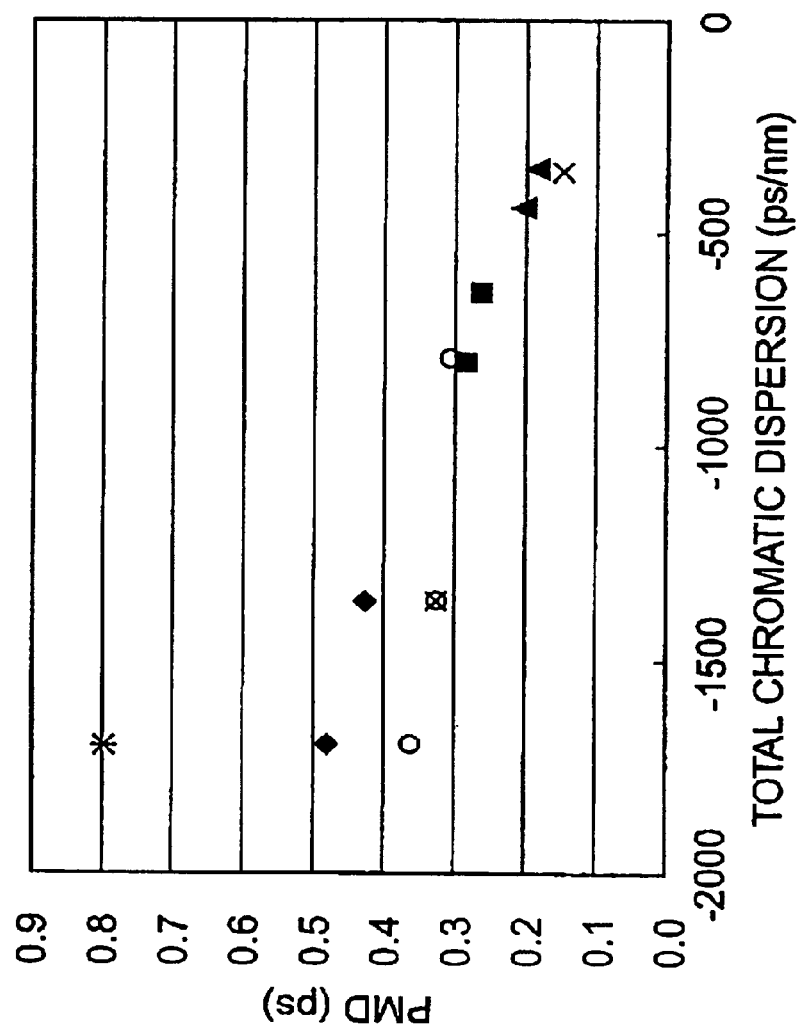
FIG. 25 is a graph showing the relationship between the polarization mode dispersion (PMD) of the dispersion compensator and the total chromatic dispersion for samples A through C and comparative examples a through c of the dispersion compensator according to the present invention.
Figure 26:
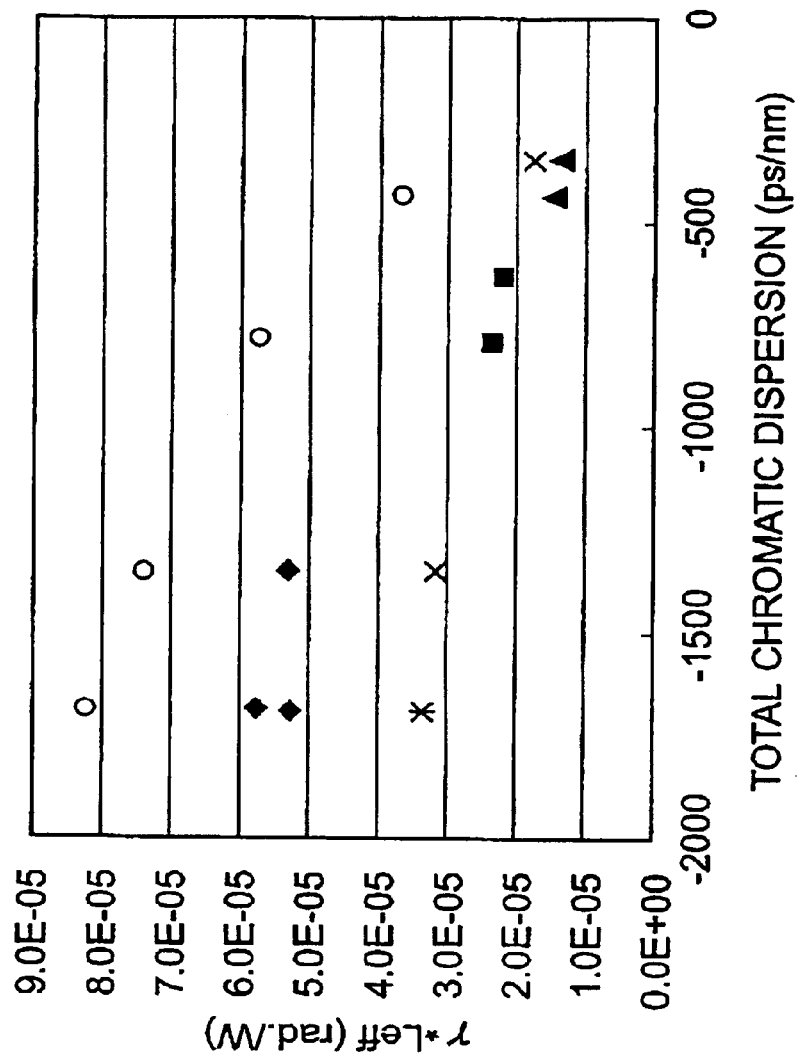
FIG. 26 is a graph showing the relationship between $\gamma^* L_{\mathit{eff}}$ and the total chromatic dispersion for samples A through C and comparative examples a through c of the dispersion compensator according to the present invention.

FIG. 23 is a graph showing the relationship between the insertion loss α and the total chromatic dispersion for samples A through C and comparative examples a through c of the dispersion compensator according to the present invention. FIG. 24 is a graph showing the relationship between the non-linear phase shift and the total chromatic dispersion for samples A through C and comparative examples a through c of the dispersion compensator according to the present invention. FIG. 25 is a graph showing the relationship between the polarization mode dispersion (PMD) and the total chromatic dispersion for samples A through C and comparative examples a through c of the dispersion compensator according to the present invention. FIG. 26 is a graph showing the relationship between $\gamma L_{eff}$ and the total chromatic dispersion for samples A through C and comparative examples a through c of the dispersion compensator according to the present invention. Here, γ is the coefficient of non-linearity. Furthermore, in FIGS. 23 through 26, the symbol "♦" indicates sample A, the symbol "■" indicates sample B, the symbol "▲" indicates sample C, the symbol "○" indicates comparative example a, the symbol "*" indicates comparative example b, and the symbol "x" indicates comparative example c.

The dispersion compensator of sample A is suitable for use in cases where a single-mode optical fiber defined in ITU-T G.652 is used as the transmission optical fiber. The dispersion compensator of sample B is suitable for use in cases where a PureGuide (registered trademark), among the non-zero 10 dispersion shifted optical fibers defined in ITU-T G.655, is used as the transmission optical fiber. Furthermore, the dispersion compensator of sample C is suitable for use in cases where a TrueWave-RS (registered trademark), among the non-zero dispersion shifted optical fibers defined in ITU-T G.655, is used as the transmission optical fiber.

The straight line in FIG. 23 indicates the boundary of the range expressed by the equations (5a) and (5b). The respective dispersion compensators of samples A through C satisfy the conditions of the equations (5a) and (5b). Furthermore, as is seen from FIGS. 23 through 26, the respective dispersion compensators of samples A through C show no problems in terms of insertion loss, amount of non-linear phase shift, polarization mode dispersion or non-linear shape characteristics.

As described above, the dispersion compensator according to the present invention can sufficiently compensate for the chromatic dispersion of a transmission optical fiber over a broad wavelength region.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber having a chromatic dispersion of −100 ps/nm/km or less in a wavelength band of 1535 to 1565 nm,
wherein, over the entire wavelength band except for the shortest and longest wavelengths thereof, a chromatic dispersion profile of the fundamental mode of said optical fiber, defined by an orthogonal coordinate system of wavelength and chromatic dispersion value, has a shape such that the chromatic dispersion values on the chromatic dispersion profile are respectively located on a minus side with respect to the associated chromatic dispersion values on a straight line connecting the chromatic dispersion values at the shortest and longest wavelengths.

2. An optical fiber according to claim 1, wherein the chromatic dispersion is −200 ps/nm/km or less.

3. An optical fiber according to claim 1, wherein said optical fiber has a negative dispersion slope over the entire wavelength band.

4. An optical fiber according to claim 1, wherein the chromatic dispersion has a minimum value at any wavelength in the wavelength band except for the shortest wavelength and longest wavelength.

5. An optical fiber according to claim 1, wherein said optical fiber has a transmission loss in which the amount of increase is 0.1 dB/km or less at a wavelength of 1550 nm when wound with an inner diameter of 60 mm.

6. A dispersion compensator comprising:
an optical fiber according to claim 1; and
a housing for accommodating said optical fiber.

7. A dispersion compensator according to claim 6, wherein said optical fiber is accommodated within said housing in a state in which said optical fiber is wound into a coil form with an inner diameter of 40 to 100 mm.

8. A dispersion compensator according to claim 6, further comprising a separate optical fiber accommodated in said housing in a state where said separate optical fiber is connected to said optical fiber, said separate optical fiber having a dispersion is slope of −0.2 ps/nm²/km or less at a wavelength of 1550 nm.

9. A dispersion compensator according to claim 6, further comprising a separate optical fiber accommodated in said housing in a state where said separate optical fiber is connected to said optical fiber, said separate optical fiber having a dispersion slope of −0.5 ps/nm²/km or less at a wavelength of 1550 nm.

10. An optical transmission line comprising:
a dispersion compensator according to claim 6; and
a transmission optical fiber connected to said dispersion compensator, said transmission optical fiber having a positive chromatic dispersion in a wavelength band of 1535 to 1610 nm.

11. An optical fiber having a chromatic dispersion of −100 ps/nm/km or less in a wavelength band of 1565 to 1610 nm, wherein, over the entire wavelength band except for the shortest and longest wavelengths thereof, a chromatic dispersion profile of the fundamental mode of said optical fiber, defined by an orthogonal coordinate system of wavelength and chromatic dispersion value, has a shape such that the chromatic dispersion values on the chromatic dispersion profile are respectively located on a minus side with respect to the associated chromatic dispersion values on a straight line connecting the chromatic dispersion values at the shortest and longest wavelengths.

12. An optical fiber according to claim 11, wherein the chromatic dispersion is −200 ps/nm/km or less.

13. An optical fiber according to claim 11, wherein said optical fiber has a negative dispersion slope over the entire wavelength band.

14. An optical fiber according to claim 11, wherein the chromatic dispersion has a minimum value at any wavelength in the wavelength band except for the shortest wavelength and longest wavelength.

15. An optical fiber according to claim 11, wherein said optical fiber has a transmission loss in which the amount of increase is 0.1 dB/km or less at a wavelength of 1550 nm when wound with an inner diameter of 60 mm.

16. A dispersion compensator comprising:
an optical fiber according to any one of claim 11; and
a housing for accommodating said optical fiber.

17. A dispersion compensator according to claim 16, wherein said optical fiber is accommodated within said housing in a state in which said optical fiber is wound into a coil form with an inner diameter of 40 to 100 mm.

18. A dispersion compensator according to claim 16, further comprising a separate optical fiber accommodated in said housing in a state where said separate optical fiber is connected to said optical fiber, said separate optical fiber having a dispersion slope of −0.2 ps/nm²/km or less at a wavelength of 1550 nm.

19. A dispersion compensator according to claim 16, further comprising a separate optical fiber accommodated in said housing in a state where said separate optical fiber is connected to said optical fiber, said separate optical fiber having a dispersion slope of −0.5 ps/nm²/km or less at a wavelength of 1550 nm.

20. An optical transmission line comprising:
a dispersion compensator according to claim 16; and
a transmission optical fiber connected to said dispersion compensator, said transmission optical fiber having a positive chromatic dispersion in a wavelength band of 1535 to 1610 nm.

21. An optical fiber having a chromatic dispersion of −100 ps/nm/km or less in a wavelength band of 1554 to 1608 nm, wherein, over the entire wavelength band except for the shortest and longest wavelengths thereof, a chromatic dispersion profile of the fundamental mode of said optical fiber, defined by an orthogonal coordinate system of wavelength and chromatic dispersion value, has a shape such that the chromatic dispersion values on the chromatic dispersion profile are respectively located on a minus side with respect to the associated chromatic dispersion values on a straight line connecting the chromatic dispersion values at the shortest and longest wavelengths.

22. An optical fiber according to claim 21, wherein the chromatic dispersion is −200 ps/nm/km or less.

23. An optical fiber according to claim 21, wherein said optical fiber has a negative dispersion slope over the entire wavelength band.

24. An optical fiber according to claim 21, wherein the chromatic dispersion has a minimum value at any wavelength in the wavelength band except for the shortest wavelength and longest wavelength.

25. An optical fiber according to claim 21, wherein said optical fiber has a transmission loss in which the amount of increase is 0.1 dB/km or less at a wavelength of 1550 nm when wound with an inner diameter of 60 mm.

26. A dispersion compensator comprising:
an optical fiber according to claim 21; and
a housing for accommodating said optical fiber.

27. A dispersion compensator according to claim 26, wherein said optical fiber is accommodated within said housing in a state in which said optical fiber is wound into a coil form with an inner diameter of 40 to 100 mm.

28. A dispersion compensator according to claim 26, further comprising a separate optical fiber accommodated in said housing in a state where said separate optical fiber is connected to said optical fiber, said separate optical fiber having a dispersion slope of −0.2 ps/nm²/km or less at a wavelength of 1550 nm.

29. A dispersion compensator according to claim 26, further comprising a separate optical fiber accommodated in said housing in a state where said separate optical fiber is connected to said optical fiber, said separate optical fiber having a dispersion slope of −0.5 ps/nm²/km or less at a wavelength of 1550 nm.

30. An optical transmission line comprising:

a dispersion compensator according to claim 26; and a transmission optical fiber connected to said dispersion compensator, said transmission optical fiber having a positive chromatic dispersion in a wavelength band of 1535 to 1610 nm.

31. An optical fiber having a chromatic dispersion of −100 ps/nm/km or less in a wavelength band of 1535 to 1610 nm, wherein, over the entire wavelength band except for the shortest and longest wavelengths thereof, a chromatic dispersion profile of the fundamental mode of said optical fiber, defined by an orthogonal coordinate system of wavelength and chromatic dispersion value, has a shape such that the chromatic dispersion values on said chromatic dispersion profile are respectively located on a minus side with respect to the associated chromatic dispersion values on a straight line connecting the chromatic dispersion values at the shortest and longest wavelengths.

32. An optical fiber according to claim 31, wherein the chromatic dispersion is −200 ps/nm/km or less.

33. An optical fiber according to claim 31, wherein said optical fiber has a negative dispersion slope over the entire wavelength band.

34. An optical fiber according to claim 31, wherein the chromatic dispersion has a minimum value at any wavelength in the wavelength band except for the shortest wavelength and longest wavelength.

35. An optical fiber according to claim 31, wherein said optical fiber has a transmission loss in which the amount of increase is 0.1 dB/km or less at a wavelength of 1550 nm when wound with an inner diameter of 60 mm.

36. A dispersion compensator comprising:

an optical fiber according to claim 31; and a housing for accommodating said optical fiber.

37. A dispersion compensator according to claim 36, wherein said optical fiber is accommodated within said housing in a state in which said optical fiber is wound into a coil form with an inner diameter of 40 to 100 mm.

38. A dispersion compensator according to claim 36, further comprising a separate optical fiber accommodated in said housing in a state where said separate optical fiber is connected to said optical fiber, said separate optical fiber having a dispersion slope of −0.2 ps/nm²/km or less at a wavelength of 1550 nm.

39. A dispersion compensator according to claim 36, further comprising a separate optical fiber accommodated in said housing in a state where said separate optical fiber is connected to said optical fiber, said separate optical fiber having a dispersion slope of −0.5 ps/nm²/km or less at a wavelength of 1550 nm.

40. An optical transmission line comprising:

a dispersion compensator according to claim 36; and a transmission optical fiber connected to said dispersion compensator, said transmission optical fiber having a positive chromatic dispersion in a wavelength band of 1535 to 1610 nm.

41. A dispersion compensator having N optical fibers (N is an integer of 2 or more) that are cascade-connected to each other, said dispersion compensator comprising:

a first optical fiber corresponding to at least one of said N optical fibers, said first optical fiber having a chromatic dispersion of −100 ps/nm/km or less in a used wavelength region which has a band width of 30 nm or more and which is included in a wavelength band of 1535 to 1610 nm, wherein, over the entire wavelength band except for the shortest and longest wavelengths thereof, a chromatic dispersion profile of the fundamental mode of said first optical fiber, defined by an orthogonal coordinate system of wavelength and chromatic dispersion value, has a shape such that the chromatic dispersion values on said chromatic dispersion profile are respectively located on a minus side with respect to the associated chromatic dispersion values on a straight line connecting the chromatic dispersion values at the shortest and longest wavelengths; and a second optical fiber which corresponds to at least one of said N optical fibers, wherein, over the entire wavelength band except for the shortest and longest wavelengths thereof, a chromatic dispersion profile of the fundamental mode of said second optical fiber, defined by an orthogonal coordinate system of wavelength and chromatic dispersion value, has a shape such that the chromatic dispersion values on said chromatic dispersion profile are respectively located on a plus side with respect to the associated chromatic dispersion values on a straight line connecting the chromatic dispersion values at the shortest and longest wavelengths;

wherein the absolute value of the RDC defined by the following equation is $10^{-4}/nm^2$ or less, where $L_n$ (km) is the length of the nth optical fiber ($1 \leq n \leq N$) of said N optical fibers, $D_n$ (ps/nm/km) is the dispersion value of the nth optical fiber at a predetermined wavelength in the used wavelength region, and $C_n$ (ps/nm³/km) is the dispersion curvature of the nth optical fiber at the predetermined wavelength;

$$RDC = \frac{\sum_{n=1}^{N} C_n L_n}{\sum_{n=1}^{N} D_n L_n}.$$

42. A dispersion compensator according to claim 41, wherein the chromatic dispersion of said first optical fiber is −200 ps/nm/km or less.

43. A dispersion compensator according to claim 41, wherein the absolute value of the RDC is $10^{-5}/nm^2$ or less.

44. A dispersion compensator according to claim 41, wherein the RDS of said dispersion compensator is 0.0032/nm to 0.0038/nm at the predetermined wavelength in the used wavelength region.

45. A dispersion compensator according to claim 41, wherein the RDS of said dispersion compensator is 0.0068/nm to 0.0082/nm at the predetermined wavelength in the used wavelength region.

46. A dispersion compensator according to claim 41, wherein the RDS of said dispersion compensator is 0.009/nm to 0.011/nm at the predetermined wavelength in the used wavelength region.

47. A dispersion compensator according to claim 41, wherein said dispersion compensator has an insertion loss α (dB) of "−0.005×(total chromatic dispersion (ps/nm/km))+

1.1" or less at the predetermined wavelength in the used wavelength region.

48. An optical transmission line comprising:
    a transmission optical fiber for transmitting signal light of a plurality of channels of different wavelengths; and
    a dispersion compensator according to claim 45 for compensating for the chromatic dispersion of said transmission optical fiber;
    wherein a difference between the respective RDS values of said transmission optical fiber and said dispersion compensator is 0.0003/nm or less at the predetermined wavelength in the used wavelength region.

49. An optical transmission line according to claim 48, wherein the absolute value of the total chromatic dispersion throughout the used wavelength region is 0.01 ps/nm/km or less.

50. An optical communications system for transmitting signal light of a plurality of channels of different wavelengths, said optical communications system including an optical transmission line according to claim 48.

51. An optical transmission line comprising:
    a transmission optical fiber for transmitting signal light of a plurality of channels of different wavelengths; and
    a dispersion compensator according to claim 45 for compensating for the chromatic dispersion of said transmission optical fiber;
    wherein a difference between the respective RDS values of said transmission optical fiber and said dispersion compensator is 0.0007/nm or less at the predetermined wavelength in the used wavelength region.

52. An optical transmission line according to claim 51, wherein the absolute value of the total chromatic dispersion throughout the used wavelength region is 0.05 ps/nm/km or less.

53. An optical communications system for transmitting signal light of a plurality of channels of different wavelengths, said optical communications system including an optical transmission line according to claim 51.

54. An optical transmission line comprising:
    a transmission optical fiber for transmitting signal light of a plurality of channels of different wavelengths; and
    a dispersion compensator according to claim 46 for compensating for the chromatic dispersion of said transmission optical fiber;
    wherein a difference between the respective RDS values of said transmission optical fiber and said dispersion compensator is 0.001/nm or less at the predetermined wavelength in the used wavelength region.

55. An optical transmission line according to claim 54, wherein the absolute value of the total chromatic dispersion throughout the used wavelength region is 0.02 ps/nm/km or less.

56. An optical communications system for transmitting signal light of a plurality of channels of different wavelengths, said optical communications system including an optical transmission line according to claim 54.

57. An optical transmission line comprising:
    a transmission optical fiber having an RDS of 0.0032/nm to 0.0038/nm at a predetermined wavelength in a used wavelength region which has a band width of 30 nm or more and which is included in a wavelength band of 1535 to 1610 nm; and
    a dispersion compensator for compensating for the chromatic dispersion of said transmission optical fiber;
    wherein a difference between the respective RDS values of said transmission optical fiber and said dispersion compensator is 0.0003/nm or less at the predetermined wavelength, and the absolute value of the total chromatic dispersion in the used wavelength region is 0.01 ps/nm/km or less.

58. An optical transmission line according to claim 57, wherein the used wavelength region includes a wavelength range of 1535 to 1565 nm.

59. An optical communications system for transmitting signal light of a plurality of channels of different wavelengths, said optical communications system including an optical transmission line according to claim 57.

60. An optical transmission line comprising:
    a transmission optical fiber having an RDS of 0.0068/nm to 0.0082/nm at a predetermined wavelength in a used wavelength region which has a band width of 30 nm or more and which is included in a wavelength band of 1535 to 1610 nm; and
    a dispersion compensator for compensating for the chromatic dispersion of said transmission optical fiber;
    wherein a difference between the respective RDS values of said transmission optical fiber and said dispersion compensator is 0.0007/nm or less at the predetermined wavelength, and the absolute value of the total chromatic dispersion in the used wavelength region is 0.05 ps/nm/km or less.

61. An optical transmission line according to claim 60, wherein the used wavelength region includes a wavelength range of 1535 to 1565 nm.

62. An optical communications system for transmitting signal light of a plurality of channels of different wavelengths, said optical communications system including an optical transmission line according to claim 60.

63. An optical transmission line comprising:
    a transmission optical fiber having an RDS of 0.009/nm to 0.011/nm at a predetermined wavelength in a used wavelength region which has a band width of 30 nm or more and which is included in a wavelength band of 1535 to 1610 nm; and
    a dispersion compensator for compensating for the chromatic dispersion of said transmission optical fiber;
    wherein a difference between the respective RDS values of said transmission optical fiber and said dispersion compensator is 0.001/nm or less at the predetermined wavelength, and the absolute value of the total chromatic dispersion in the used wavelength region is 0.019 ps/nm/km or less.

64. An optical transmission line according to claim 63, wherein the used wavelength region includes a wavelength range of 1535 to 1565 nm.

65. An optical communications system for transmitting signal light of a plurality of channels of different wavelengths, said optical communications system including an optical transmission line according to claim 63.

* * * * *